(12) United States Patent
Nakayama

(10) Patent No.: US 11,035,271 B2
(45) Date of Patent: Jun. 15, 2021

(54) CONTROL APPARATUS FOR VEHICLE

(71) Applicant: TOYOTA JIDOSHA KABUSHIKI KAISHA, Aichi-ken (JP)

(72) Inventor: Yusuke Nakayama, Gotemba (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 284 days.

(21) Appl. No.: 16/299,024

(22) Filed: Mar. 11, 2019

(65) Prior Publication Data

US 2019/0277176 A1 Sep. 12, 2019

(30) Foreign Application Priority Data

Mar. 12, 2018 (JP) ............... JP2018-044286

(51) Int. Cl.
*F01N 3/20* (2006.01)
*B60R 16/033* (2006.01)
(Continued)

(52) U.S. Cl.
CPC .............. *F01N 3/2013* (2013.01); *B60K 6/40* (2013.01); *B60R 16/033* (2013.01); *B60W 20/16* (2016.01);
(Continued)

(58) Field of Classification Search
CPC ........ F01N 3/2013; F01N 9/00; F01N 3/2006; F01N 2900/104; F01N 2240/14; F01N 2240/16; F01N 2900/1631; B60R 16/033; B60K 6/40; B60K 6/445; B60W 20/16; B60W 2530/213; B60W 2530/211; B60Y 2200/92; B60Y 2300/192; Y02A 50/20; Y02T 10/40; Y02T 10/62; Y02T 10/12; F02D 45/00; F02M 31/125
See application file for complete search history.

(56) References Cited

U.S. PATENT DOCUMENTS 6,481,200 B1 * 11/2002 Hirota ................. F01N 13/0093
60/284
6,718,758 B1 * 4/2004 Suzuki .................. B60W 10/26
60/300

(Continued)

FOREIGN PATENT DOCUMENTS

JP H08338235 A * 6/1995 ............. Y02A 50/20
JP 2003-269208 A 9/2003
JP 2011-149314 A 8/2011

*Primary Examiner* — Frederick M Brushaber
(74) *Attorney, Agent, or Firm* — Hauptman Ham, LLP

(57) ABSTRACT

A control apparatus for a vehicle controls the supply of electric power from a battery to first and/or second heat generating element(s), before starting of the internal combustion engine. When a suppliable amount of electric power is equal to or less than a first amount of electric power, the control apparatus controls the supply of electric power so that a whole amount of electric power within the suppliable amount of electric power is supplied to the second heat generating element, whereas when the suppliable amount of electric power is larger than the first amount of electric power but is equal to or less than a second amount of electric power, the control apparatus controls the supply of electric power so that the whole amount of electric power within the suppliable amount of electric power is supplied to the first heat generating element.

7 Claims, 16 Drawing Sheets

(51) Int. Cl.
 *B60K 6/40* (2007.10)
 *F01N 9/00* (2006.01)
 *B60W 20/16* (2016.01)
 *B60K 6/445* (2007.10)

(52) U.S. Cl.
 CPC ......... *F01N 9/00* (2013.01); *B60W 2530/213* (2020.02); *B60Y 2200/92* (2013.01); *B60Y 2300/192* (2013.01)

(56) References Cited

U.S. PATENT DOCUMENTS

| | | | | |
|---|---|---|---|---|
| 7,316,219 | B2* | 1/2008 | Yamaguchi | F02D 41/064 |
| | | | | 123/431 |
| 7,587,269 | B2* | 9/2009 | Kamichi | B60K 6/448 |
| | | | | 701/110 |
| 7,987,935 | B2* | 8/2011 | Ichimoto | F01N 13/0097 |
| | | | | 180/65.28 |
| 8,423,221 | B2* | 4/2013 | Watanabe | F01N 3/2026 |
| | | | | 701/22 |
| 8,473,178 | B2* | 6/2013 | Oe | B60K 6/365 |
| | | | | 701/102 |
| 8,838,310 | B2* | 9/2014 | Tomatsuri | B60W 20/50 |
| | | | | 701/22 |
| 9,296,390 | B2* | 3/2016 | Martin | F01N 11/00 |
| 2003/0172643 | A1 | 9/2003 | Suzuki | |
| 2004/0099234 | A1* | 5/2004 | Tamai | B60K 6/28 |
| | | | | 123/179.3 |
| 2011/0178665 | A1 | 7/2011 | Yoshioka et al. | |

* cited by examiner

[Fig. 1]
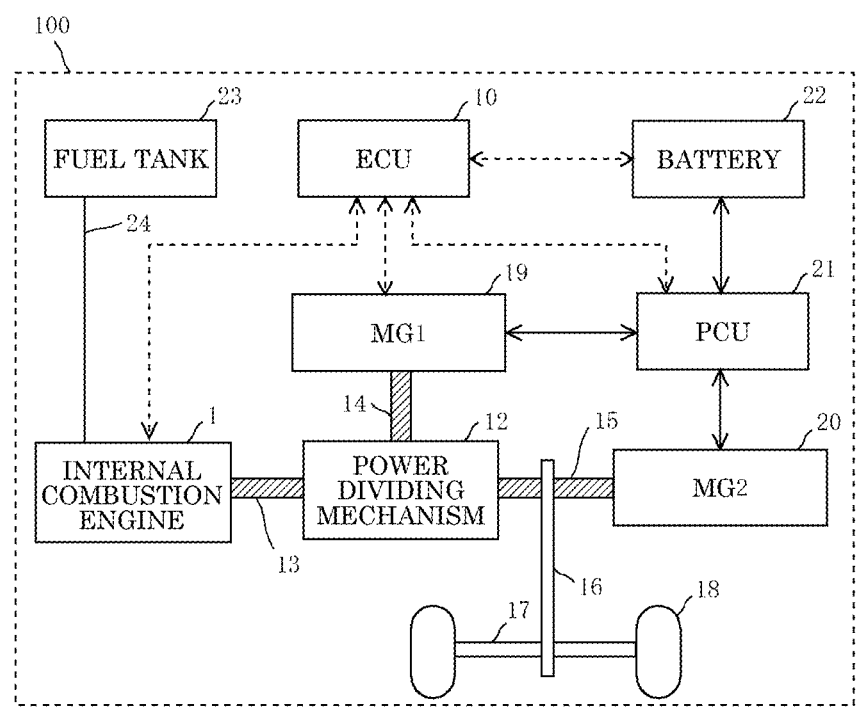

[Fig. 2]
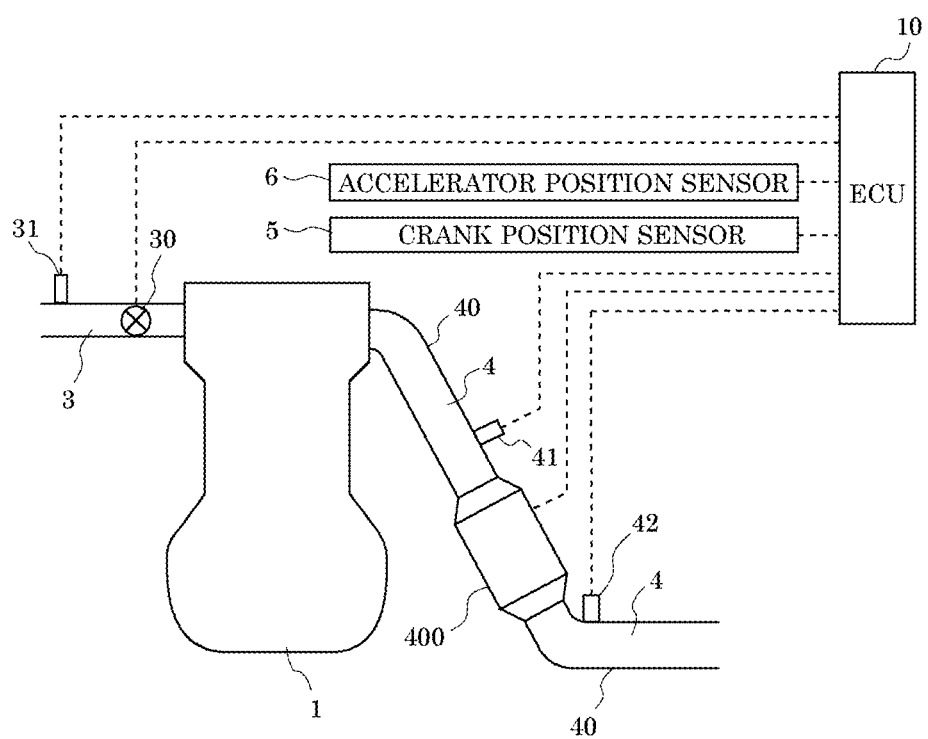

[Fig. 3]
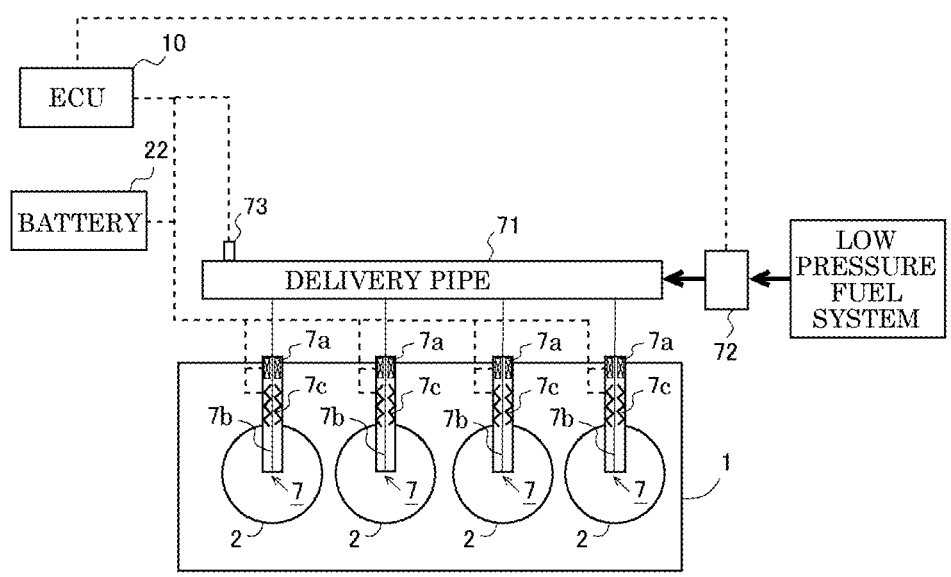

[Fig. 4]
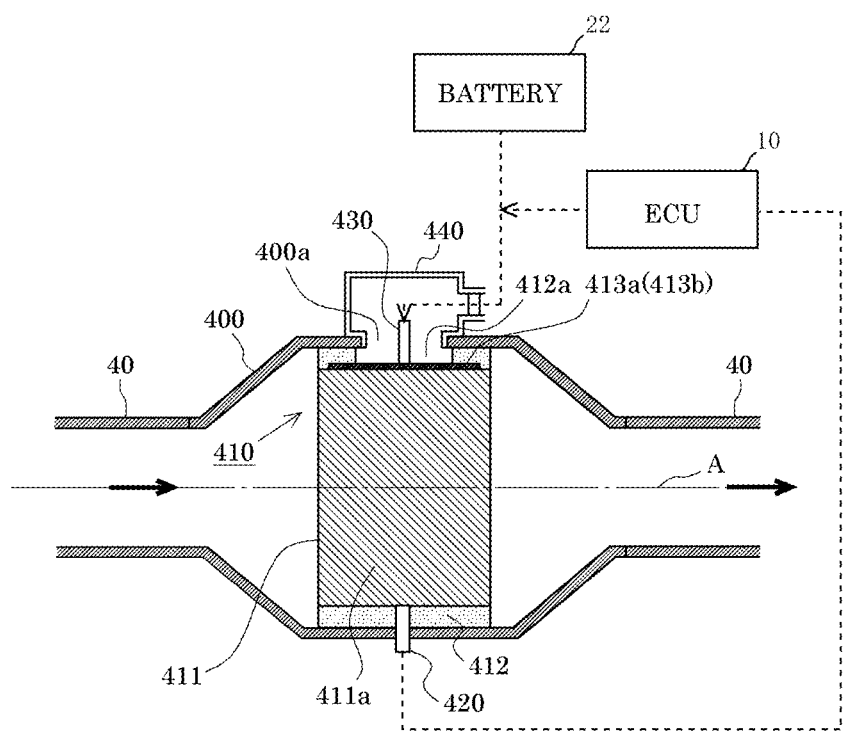

[Fig. 5]
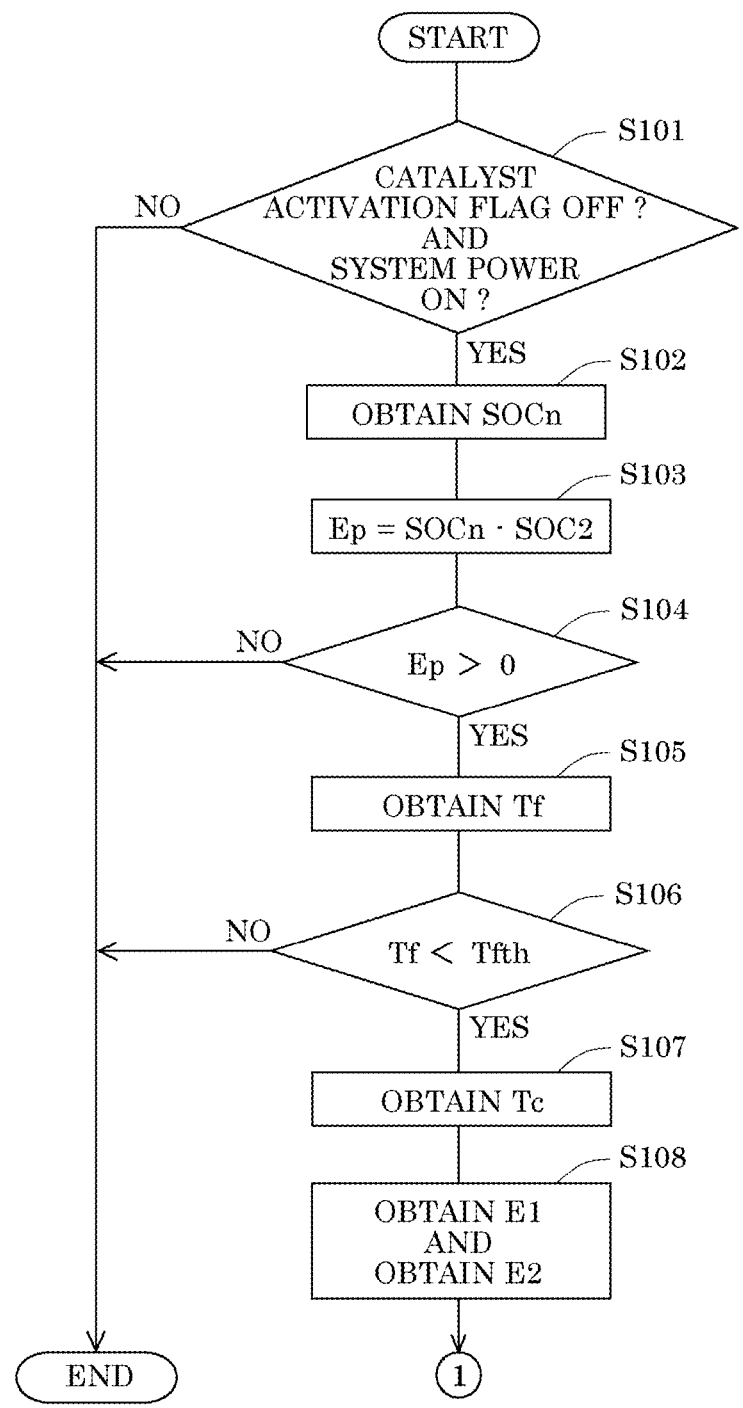

[Fig. 6]
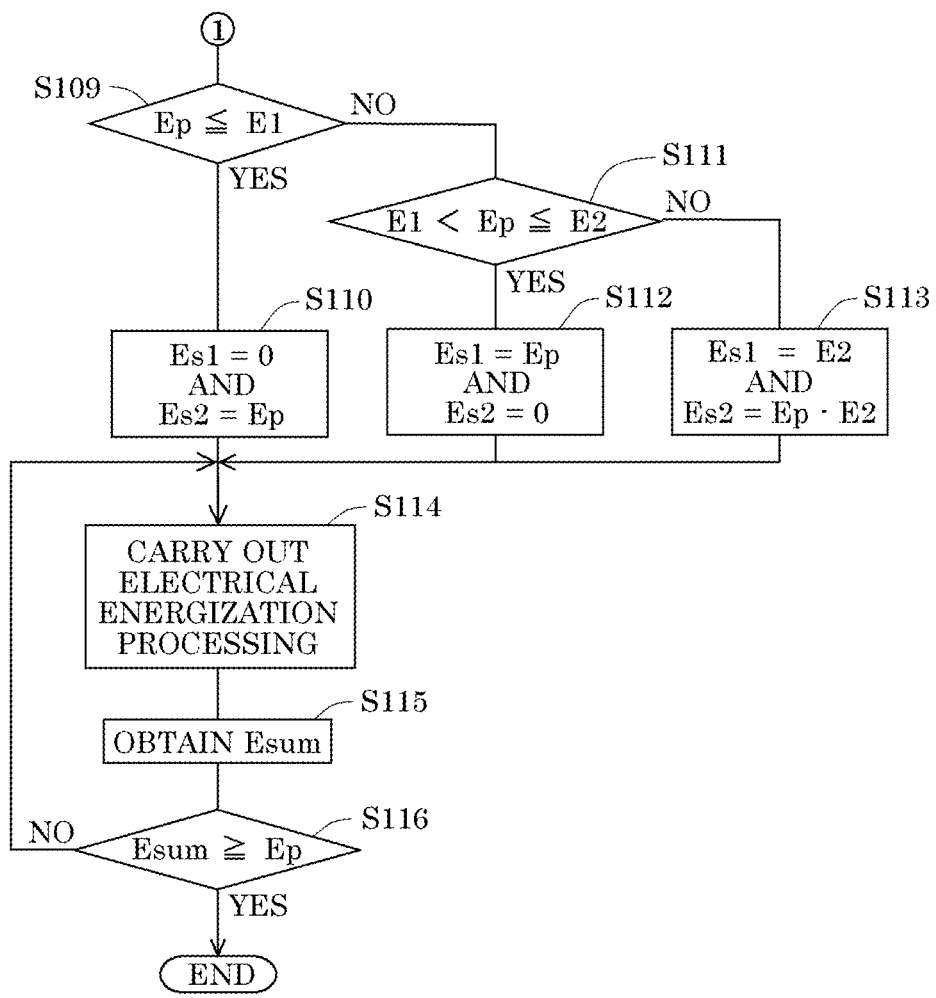

[Fig. 7]
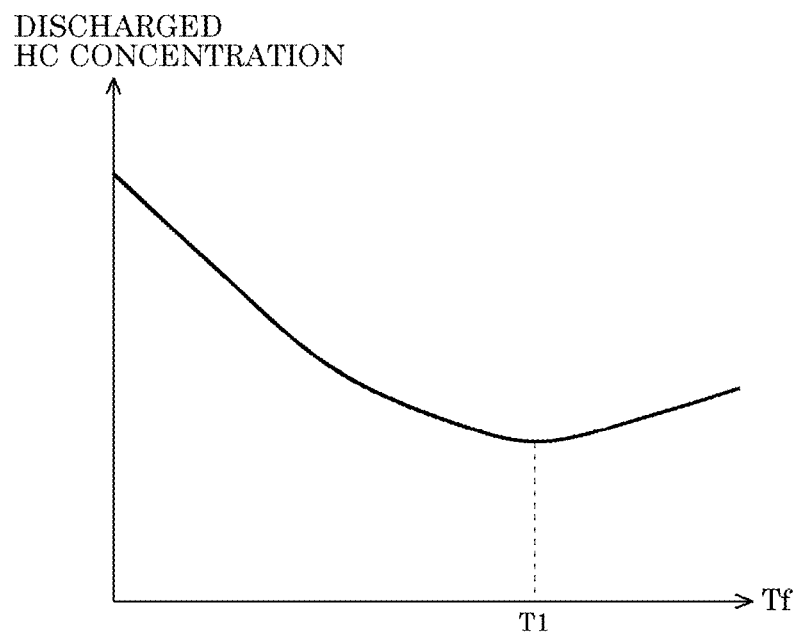

[Fig. 8]
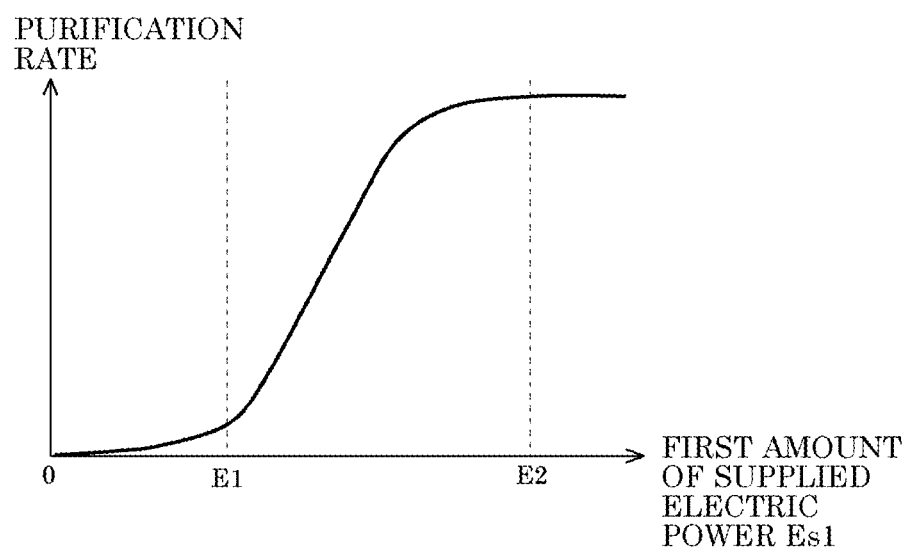

[Fig. 9]
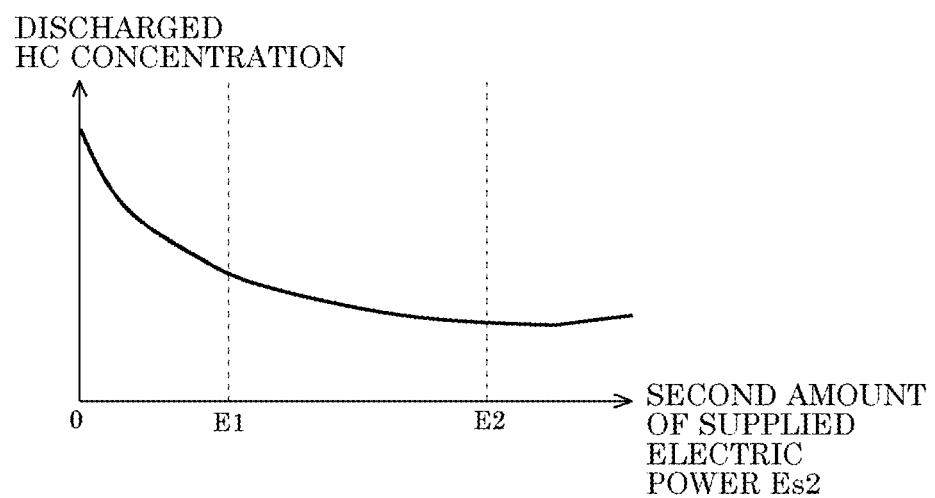

[Fig. 10]
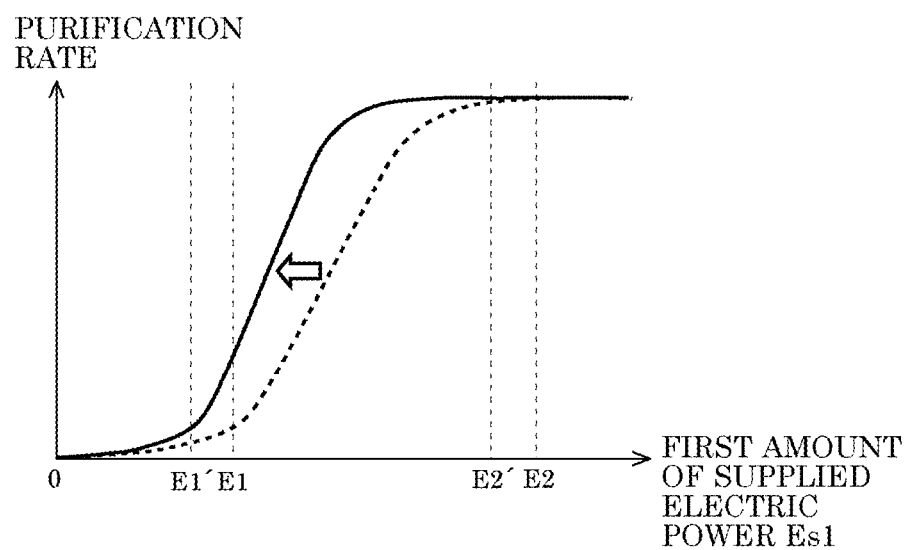

[Fig. 11]
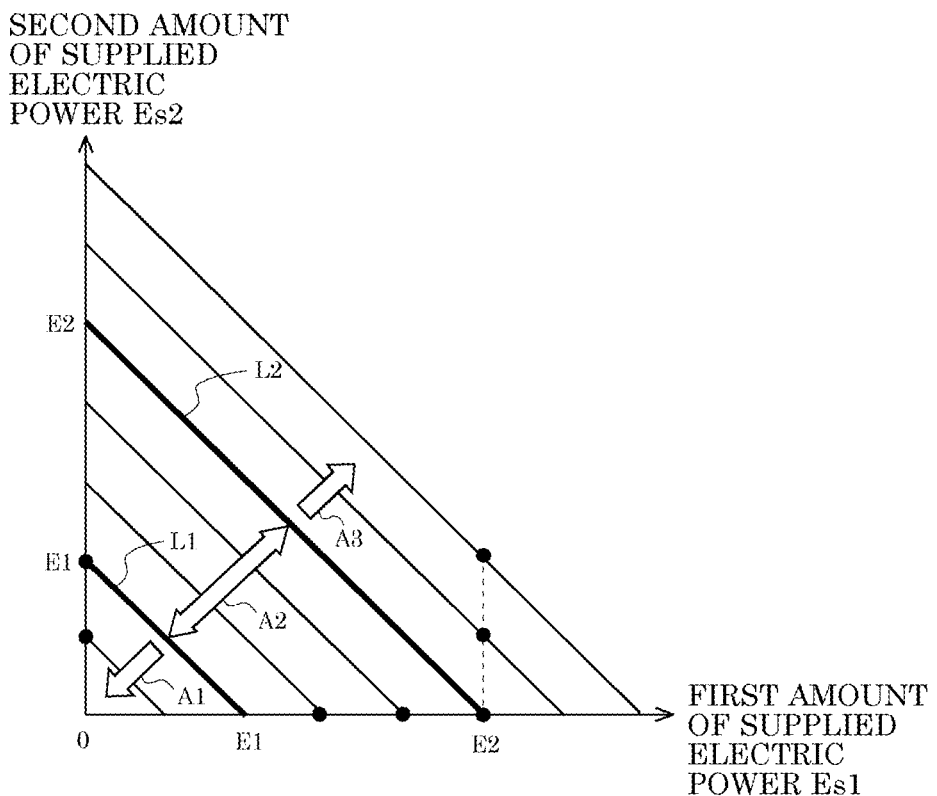

[Fig. 12]
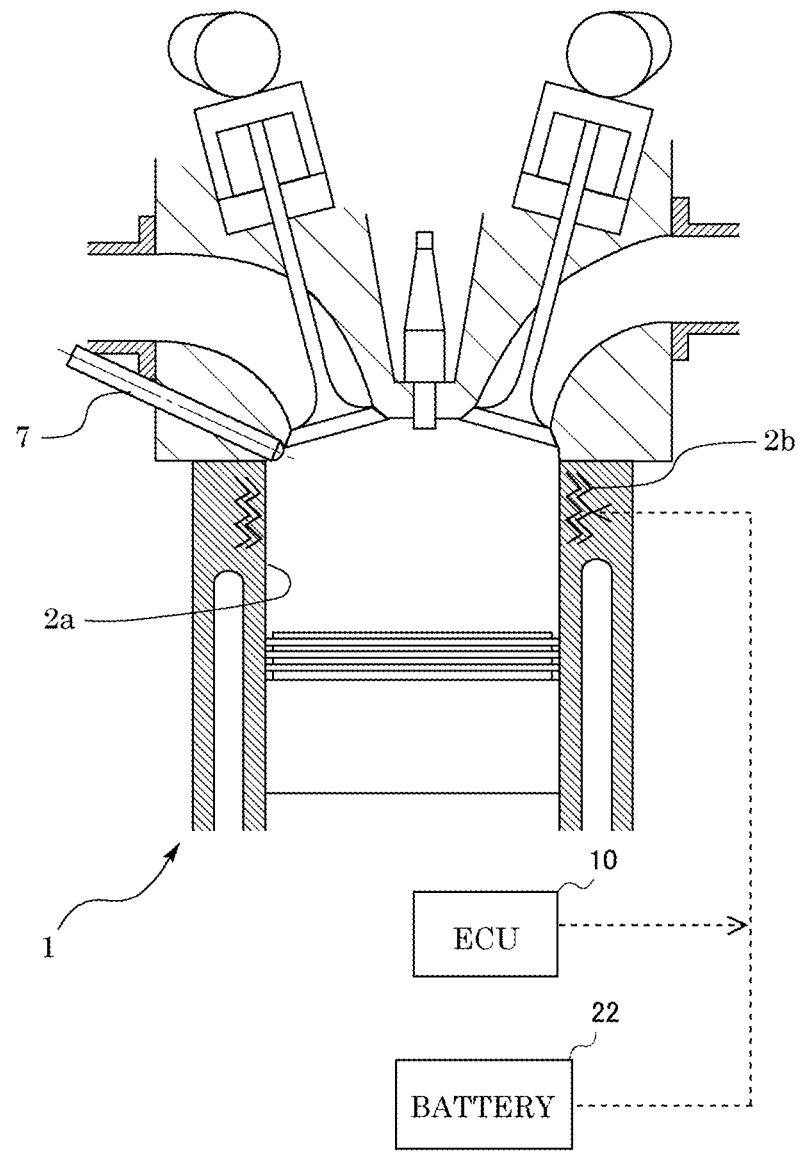

[Fig. 13]
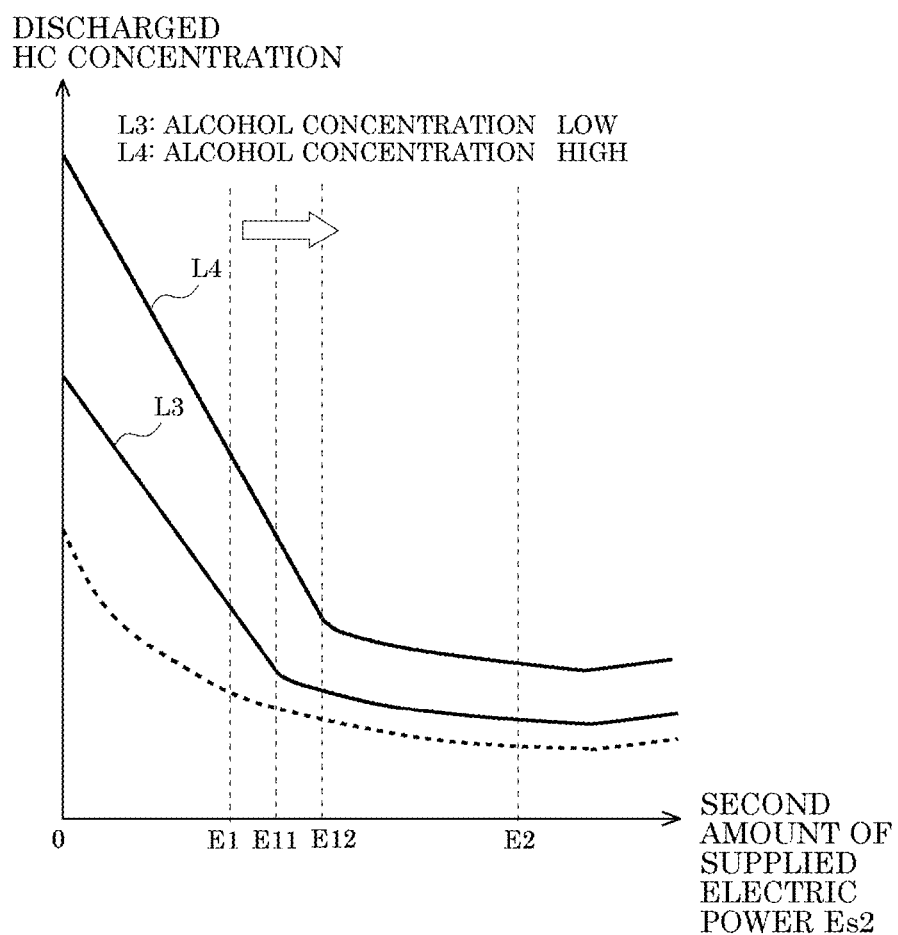

[Fig. 14]
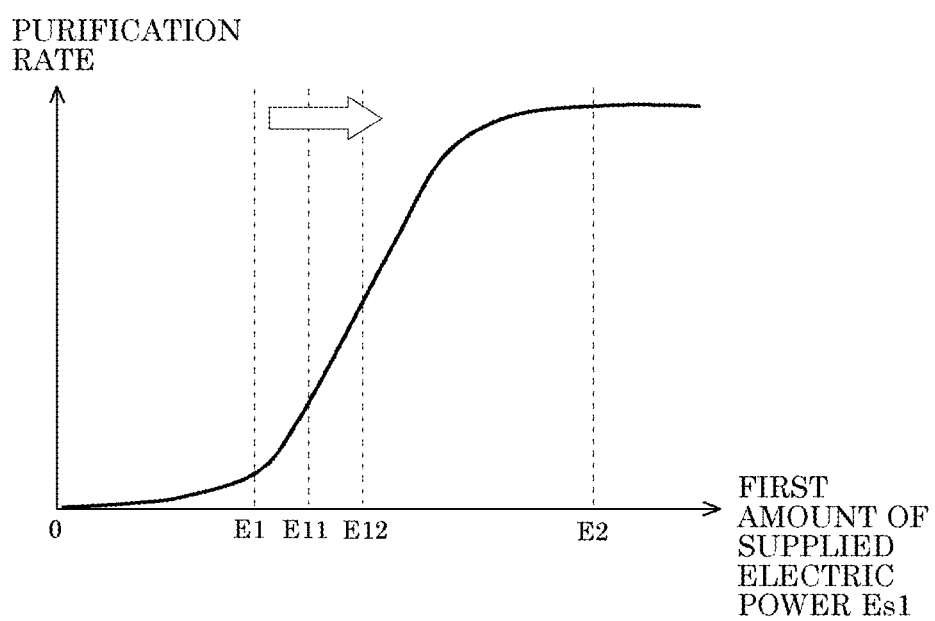

[Fig. 15A]
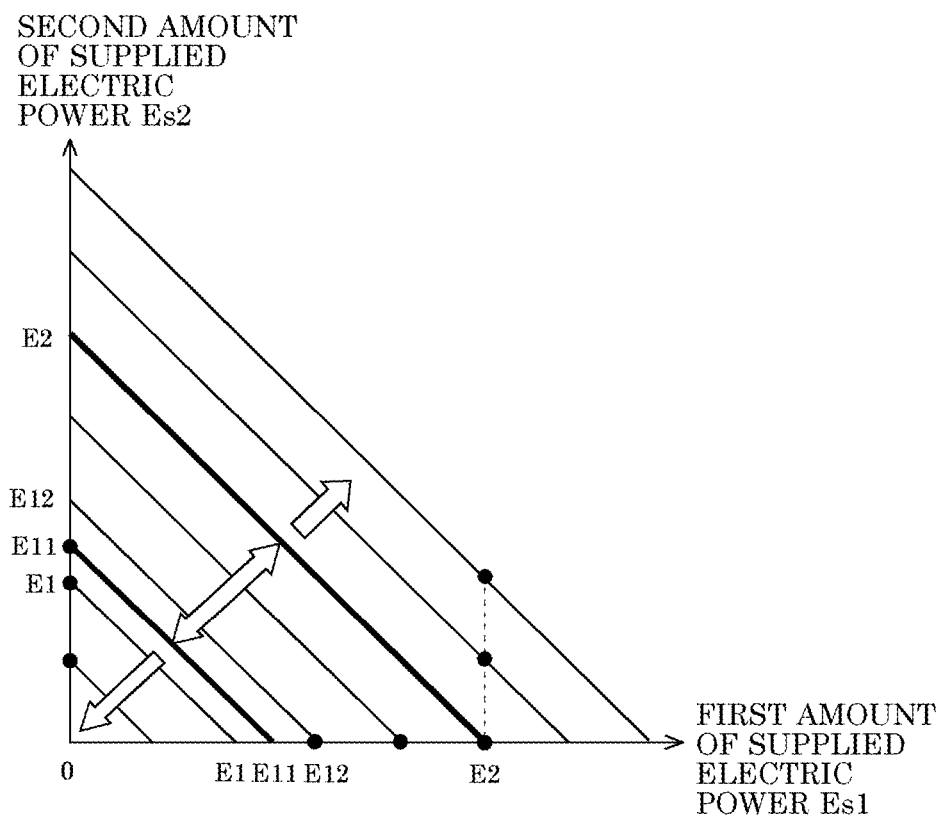

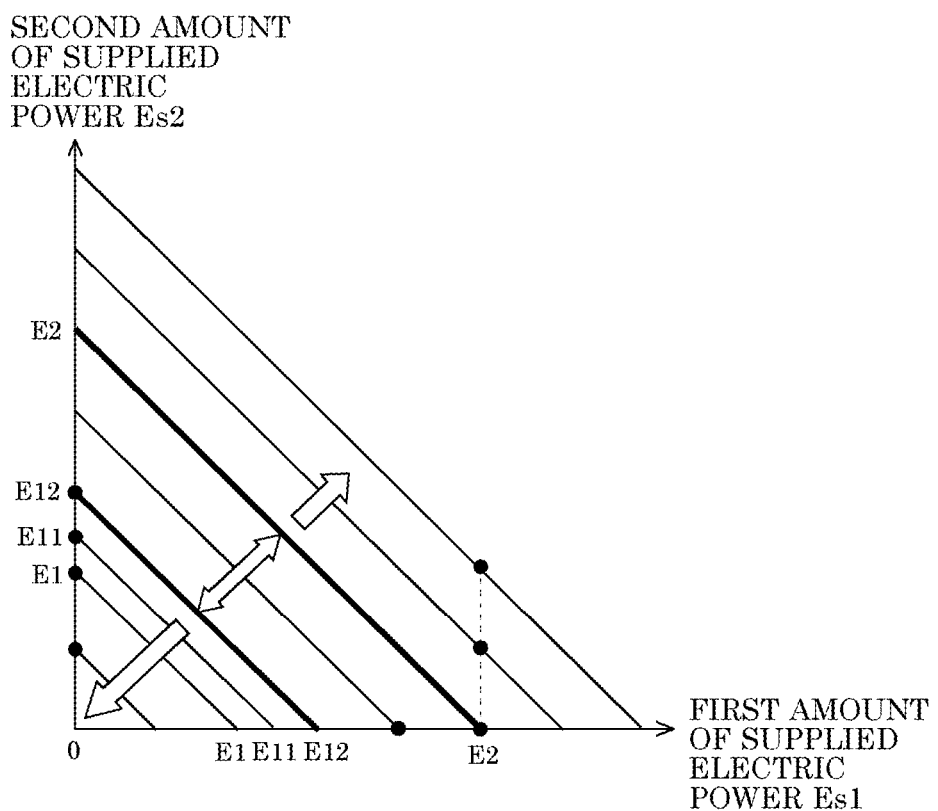
[Fig. 15B]

CONTROL APPARATUS FOR VEHICLE

CROSS-REFERENCE TO RELATED APPLICATIONS

This application claims the benefit of Japanese Patent Application No. 2018-044286, filed on Mar. 12, 2018 which is hereby incorporated by reference herein in its entirety.

BACKGROUND

Technical Field

The present disclosure relates to a control apparatus for a vehicle.

Description of the Related Art

In a hybrid vehicle provided with an internal combustion engine and a motor, there has been known a technology in which the internal combustion engine and/or an exhaust gas purification catalyst is electrically heated in advance by using electric power supplied from a battery mounted on the vehicle, before the internal combustion engine is started (for example, refer to patent literature 1).

CITATION LIST

Patent Literature

Patent Literature 1: Japanese Patent Application Laid-Open No. 2003-269208

SUMMARY

Harmful components discharged from the vehicle (tail pipe) at the time of starting of the internal combustion engine can be reduced by electrically heating the exhaust gas purification catalyst in advance before the internal combustion engine is started. In addition, the harmful components discharged from the internal combustion engine at the time of starting of the internal combustion engine can also be reduced by electrically heating the internal combustion engine in advance before the internal combustion engine is started. Then, electrical heating as mentioned above is achieved by using electric power from the battery mounted on the vehicle.

Here, if the exhaust gas purification catalyst can be activated by electric heating before the internal combustion engine is started, the discharge of harmful components from the vehicle at the time of starting of the internal combustion engine will be suppressed as much as possible. However, for example, in cases where the amount of electricity stored in the battery is relatively small, a sufficient amount of electric power can not be used for the electric heating of the exhaust gas purification catalyst.

Then, in cases where an amount of electric power available for the electric heating of the exhaust gas purification catalyst before the starting of the internal combustion engine is less than an amount of electric power required to activate the exhaust gas purification catalyst, even if the electric heating of the exhaust gas purification catalyst is carried out before the starting of the internal combustion engine, harmful components may be discharged from the vehicle at the time of starting of the internal combustion engine.

The present disclosure has been made in view of the above-mentioned problems, and has for its object to suppress as much as possible the discharge of harmful components from a vehicle at the time of starting of an internal combustion engine.

A control apparatus for a vehicle according to the present disclosure can be applied to the vehicle which is provided with: an exhaust gas purification catalyst arranged in an exhaust passage of an internal combustion engine and configured to remove a predetermined component contained in an exhaust gas of the internal combustion engine; a first heat generating element arranged in the exhaust passage and configured to generate heat by being supplied with electric power thereby to heat the exhaust gas purification catalyst; a second heat generating element configured to generate heat by being supplied with electric power thereby to heat a predetermined portion related to the fuel to be burnt in the internal combustion engine; and a battery configured to supply electric power to the first heat generating element and the second heat generating element. The control apparatus includes a controller comprising at least one processor. The controller is configured to control the supply of electric power from the battery to the first heat generating element and/or the second heat generating element before starting of the internal combustion engine.

According to such a control apparatus, before the starting of the internal combustion engine, the exhaust gas purification catalyst can be electrically heated by using the first heat generating element, or the predetermined portion related to the fuel can be electrically heated by using the second heat generating element. Here, when the exhaust gas purification catalyst is electrically heated before the starting of the internal combustion engine, the exhaust gas purification catalyst is raised in temperature, and the exhaust gas purification performance of the exhaust gas purification catalyst at the time of starting of the internal combustion engine is improved. In addition, when the predetermined portion related to fuel is electrically heated before the starting of the internal combustion engine, the combustion of fuel at the time of starting of the internal combustion engine is promoted resulting from a rise in the fuel temperature.

Then, in the control apparatus for a vehicle according to the present disclosure, in cases where a suppliable amount of electric power, which is an upper limit amount of electric power capable of being supplied from the battery to the first heat generating element and/or the second heat generating element before starting of the internal combustion engine, is equal to or less than a second amount of electric power, which is an amount of electric power required to activate the exhaust gas purification catalyst by using the first heat generating element, and in cases where the suppliable amount of electric power is equal to or less than a predetermined first amount of electric power which is smaller than the second amount of electric power, a whole amount of electric power within the suppliable amount of electric power is supplied to the first heat generating element before the starting of the internal combustion engine, whereas in cases where the suppliable amount of electric power is larger than the first amount of electric power, the supply of electric power is controlled so that the whole amount of electric power within the suppliable amount of electric power can be supplied to the first heat generating element before the starting of the internal combustion engine.

The second amount of electric power is an amount of electric power or electric energy required to activate the exhaust gas purification catalyst by using the first heat generating element (hereinafter, sometimes referred to as an "activation amount of electric power"), as mentioned above. For that reason, when the suppliable amount of electric power is smaller than the second amount of electric power, the exhaust gas purification catalyst can not be activated even if it is electrically heated before the starting of the internal combustion engine. Accordingly, by controlling the supply of electric power in the above-mentioned manner, the control apparatus makes it possible to suppress as much as possible the discharge of harmful components from the vehicle at the time of starting of the internal combustion engine.

At this time, it has been found that by defining the first amount of electric power, which is a predetermined amount of electric power smaller than the second amount of electric power, in the following manner, the discharge of harmful components from the vehicle at the time of starting of the internal combustion engine is suppressed as much as possible. Specifically, the first amount of electric power is defined based on an improvement effect of the exhaust gas purification performance due to the electric heating of the exhaust gas purification catalyst in a cold state (also referred to as a catalyst heating effect), and a fuel combustion promotion effect due to the electric heating of the predetermined portion of the internal combustion engine in a cold state (also referred to as an internal combustion engine heating effect). Then, in cases where either the exhaust gas purification catalyst or the predetermined portion of the internal combustion engine is electrically heated by using an amount of electric power equal to or less than the first amount of electric power, their influence on the harmful components discharged from the vehicle at the time of starting of the internal combustion engine becomes larger in the degree of influence according to the internal combustion engine heating effect than in the degree of influence according to the catalyst heating effect. In other words, at this time, a reduction effect of the harmful components discharged from the vehicle at the time of starting of the internal combustion engine becomes larger in the case where the predetermined portion of the internal combustion engine is electrically heated, in comparison with the case where the exhaust gas purification catalyst is electrically heated.

Accordingly, in cases where the suppliable amount of electric power is equal to or less than the first amount of electric power, the controller controls the supply of electric power so that the whole amount of electric power within the suppliable amount of electric power can be supplied to the second heat generating element. This can suppress the discharge of harmful components from the vehicle at the time of starting of the internal combustion engine as much as possible.

In contrast to this, in cases where either the exhaust gas purification catalyst or the predetermined portion of the internal combustion engine is electrically heated by using an amount of electric power which is larger than the first amount of electric power but is equal to or less than the second amount of electric power, their influence on the harmful components discharged from the vehicle at the time of starting of the internal combustion engine becomes larger in the degree of influence according to the catalyst heating effect than in the degree of influence according to the internal combustion engine heating effect. In other words, at this time, the reduction effect of the harmful components discharged from the vehicle at the time of starting of the internal combustion engine becomes larger in the case where the exhaust gas purification catalyst is electrically heated, in comparison with the case where the predetermined portion of the internal combustion engine is electrically heated.

Accordingly, in cases where the suppliable amount of electric power is larger than the first amount of electric power but is equal to or less than the second amount of electric power, the controller controls the supply of electric power so that the whole amount of electric power within the suppliable amount of electric power is supplied to the first heat generating element. This can suppress the discharge of harmful components from the vehicle at the time of starting of the internal combustion engine as much as possible.

As described above, the control apparatus according to the present disclosure makes it possible to suppress as much as possible the discharge of harmful components from the vehicle at the time of starting of the internal combustion engine.

In addition, in cases where the suppliable amount of electric power is larger than the second amount of electric power, the controller may control the supply of electric power so that electric power in the second amount of electric power is supplied to the first heat generating element, before the starting of the internal combustion engine, and at the same time, may control the supply of electric power so that electric power in an amount of electric power which is obtained by subtracting the second amount of electric power from the suppliable amount of electric power is supplied to the second heat generating element.

In this case, the suppliable amount of electric power will be more than the activation amount of electric power. Here, the exhaust gas purification catalyst activated by the electric power in the activation amount of electric power being supplied to the first heat generating element has a tendency that it becomes difficult to improve the exhaust gas purification performance (i.e., the degree of improvement of the exhaust gas purification performance becomes small), even if an amount of electric power more than that is supplied to the first heat generating element. On the other hand, even if the exhaust gas purification performance in the exhaust gas purification catalyst is the same, the discharge of harmful components from the vehicle is suppressed more in the case where the discharge of harmful components from the internal combustion engine is small than in the case where it is large.

Here, according to the above-mentioned control, the amount of electric power supplied to the second heat generating element can be made as large as possible, while activating the exhaust gas purification catalyst by using the first heat generating element. In other words, the discharge of harmful components from the internal combustion engine can be made as small as possible, while making the exhaust gas purification performance in the exhaust gas purification catalyst as high as possible. According to this, it is possible to suppress the discharge of harmful components from the vehicle at the time of starting of the internal combustion engine as much as possible.

Moreover, an alcohol component may be included in the fuel. Then, the controller may be further configured to set the first amount of electric power larger when an alcohol concentration in the fuel is high, than when it is low. And the controller may control the supply of electric power from the battery to the first heat generating element and/or the second heat generating element, based on the first amount of electric power set by the controller.

Here, in cases where the alcohol component is included in the fuel (e.g., in cases where fuel in which the alcohol component is mixed with gasoline is used as the fuel of the internal combustion engine), the combustion of the fuel deteriorates more easily, in comparison with the case where the alcohol component is not included (e.g., the case where gasoline is used as the fuel of the internal combustion engine). On the other hand, when electric power is supplied to the second heat generating element and the predetermined portion is electrically heated, this tendency is mitigated by the internal combustion engine heating effect. Then, the higher the alcohol concentration in the fuel, the larger the internal combustion engine heating effect becomes.

Here, according to the above-mentioned definition of the first amount of electric power, in cases where the exhaust gas purification catalyst or the predetermined portion of the internal combustion engine is electrically heated by using an amount of electric power equal to or less than the first amount of electric power, the reduction effect of the harmful components discharged from the vehicle at the time of starting of the internal combustion engine becomes larger in the case where the predetermined portion of the internal combustion engine is electrically heated, in comparison with the case where the exhaust gas purification catalyst is electrically heated. Accordingly, the controller sets the first amount of electric power larger when the alcohol concentration in the fuel is high, than when it is low, and the control apparatus controls the supply of electric power based on the first amount of electric power, thereby making it possible to suppress the discharge of harmful components from the vehicle at the time of starting of the internal combustion engine as much as possible.

In the control apparatus for a vehicle described above, the predetermined portion may include a portion which is related to atomization of the fuel injected from a fuel injection valve provided in the internal combustion engine. According to this, the portion related to the atomization of the fuel injected from the fuel injection valve will be electrically heated. Here, the portion related to the atomization of the fuel injected from the fuel injection valve can be defined as a portion capable of raising the temperature of the fuel injected from the fuel injection valve. This is because there is a tendency that when the temperature of the fuel injected from the fuel injection valve becomes high, the atomization of the injected fuel is promoted. Then, when the atomization of the injected fuel is promoted, the combustion of the fuel at the time of starting of the internal combustion engine will also be promoted. With this, the discharge of harmful components from the internal combustion engine is suppressed.

Further, the predetermined portion may include a portion which is related to adhesion of the fuel injected from a fuel injection valve provided in the internal combustion engine. According to this, the portion related to the adhesion of the fuel injected from the fuel injection valve will be electrically heated. Thus, the adhesion of the injected fuel is suppressed, whereby the discharge of harmful components from the internal combustion engine is also suppressed.

In addition, in the control apparatus for a vehicle according to the present disclosure, the vehicle may be a hybrid vehicle which is provided with the internal combustion engine and an electric motor, and which is capable of traveling by means of the driving force of the electric motor in a state where the internal combustion engine has been stopped, and the battery may supply electric power to the first heat generating element, the second heat generating element and the electric motor. Then, when an amount of electricity stored in the battery at the time when charging of the battery by the driving force of the internal combustion engine is requested is defined as a first amount of stored electricity and an amount of stored electricity which is the first amount of stored electricity added by a predetermined margin is defined as a second amount of stored electricity, the suppliable amount of electric power may be defined as an amount of electric power which is obtained by subtracting the second amount of stored electricity from an amount of electricity stored in the battery before the supply of electric power from the battery to the first heat generating element and/or the second heat generating element is carried out.

In such a vehicle, it is possible to carry out EV travel in which the vehicle travels by means of the driving force of the electric motor in the state where the internal combustion engine has been stopped. Then, when the amount of electricity stored in the battery decreases to the first amount of stored electricity during the EV travel, the internal combustion engine is started. Here, as mentioned above, the second amount of stored electricity is an amount of stored electricity which is obtained by adding the predetermined margin to the first amount of stored electricity. Then, when the battery has the electric power in the second amount of stored electricity, the vehicle can be made to run in an EV travel mode, without starting the internal combustion engine. In the above-mentioned hybrid vehicle, the suppliable amount of electric power is set so that the second amount of stored electricity is ensured. For that reason, before the starting of the internal combustion engine, the vehicle can be made to run in the EV travel mode, while supplying electric power to the first heat generating element and/or the second heat generating element.

According to the present disclosure, it is possible to suppress the discharge of harmful components from a vehicle at the time of starting of an internal combustion engine as much as possible.

BRIEF DESCRIPTION OF DRAWINGS

FIG. 1 is a view illustrating the schematic construction of a vehicle according to a first embodiment of the present disclosure.

FIG. 2 is a view illustrating the schematic construction of an internal combustion engine according to the first embodiment of the present disclosure.

FIG. 3 is a view illustrating the schematic construction of a high pressure fuel system of the internal combustion engine according to the first embodiment of the present disclosure.

FIG. 4 is a view illustrating the schematic construction of an exhaust gas purification apparatus according to the first embodiment of the present disclosure.

FIG. 5 is a first flow chart illustrating a control flow according to the first embodiment of the present disclosure.

FIG. 6 is a second flow chart illustrating the control flow according to the first embodiment of the present disclosure.

FIG. 7 is a view illustrating a correlation between a fuel temperature and a discharged HC concentration.

FIG. 8 is a view illustrating a correlation between a first amount of supplied electric power and a purification rate.

FIG. 9 is a view illustrating a correlation between a second amount of supplied electric power and the discharged HC concentration.

FIG. 10 is a view for explaining the influence of the temperature of a catalyst in a cold state on the correlation between the first amount of supplied electric power and the purification rate.

FIG. 11 is a view for explaining the distribution of electric power from a battery to an EHC carrier and/or electric heating wires in the first embodiment of the present disclosure.

FIG. 12 is a view illustrating a schematic diagram of a cylinder of an internal combustion engine according to a modification of the first embodiment of the present disclosure.

FIG. 13 is a view for explaining the influence of an alcohol concentration in an alcohol mixed fuel on a correlation between a second amount of supplied electric power and a discharged HC concentration.

FIG. 14 is a view illustrating amounts of electric power E11, E12 illustrated in FIG. 13 overlapped on the correlation between the first amount of supplied electric power and the purification rate illustrated in FIG. 8.

FIG. 15A is a first view for explaining the distribution of electric power from a battery to an EHC carrier and/or electric heating wires in the second embodiment of the present disclosure.

FIG. 15B is a second view for explaining the distribution of electric power from the battery to the EHC carrier and/or the electric heating wires in the second embodiment of the present disclosure.

DESCRIPTION OF EMBODIMENTS

Hereinafter, modes (embodiments) for carrying out the present disclosure will be described in detail by way of example with reference to the attached drawings. However, the dimensions, materials, shapes, relative arrangements and so on of component parts described in the embodiments are not intended to limit the scope of the present disclosure to these alone in particular as long as there are no specific statements.

First Embodiment

In this first embodiment, the present disclosure is applied to a hybrid vehicle which is provided with an internal combustion engine and a motor-generator.

<Arrangement of the Hybrid Vehicle>

FIG. 1 is a view illustrating the schematic construction of a vehicle 100 according to the first embodiment. The vehicle 100 illustrated in FIG. 1 has the internal combustion engine 1 as a driving source, a first motor-generator 19, and a second motor-generator 20. Here, the first motor-generator 19 and the second motor-generator 20 are each constructed as a well-known electric motor of an alternating current synchronous type which functions as a generator and also functions as an electric motor.

The vehicle 100 is constructed including, as main structures, an ECU (Electronic Control Unit) 10, a power dividing mechanism 12, a reduction gear 16, a PCU (Power Control Unit) 21, a battery 22 and so on, in addition to the above-mentioned arrangement. Then, as illustrated in FIG. 1, the internal combustion engine 1 has a crankshaft connected with an output shaft 13, and the output shaft 13 is connected with the power dividing mechanism 12. The power dividing mechanism 12 is connected with the first motor-generator 19 through a power transmission shaft 14, and is also connected with the second motor-generator 20 through a power transmission shaft 15. Here, the power dividing mechanism 12a employs a well-known planetary gear mechanism (illustration omitted), and transmits the mechanical power of the internal combustion engine 1, the first motor-generator 19 and the second motor-generator 20 in a distributive and collective manner. In addition, the reduction gear 16 is connected with the power transmission shaft 15, so that an output from each driving source is transmitted to the drive shaft 17 through the reduction gear 16. Then, drive wheels 18 connected with the drive shaft 17 are driven to rotate, so that the vehicle 100 will be thereby driven to run.

Then, the PCU 21 is electrically connected to the first motor-generator 19, the second motor-generator 20 and the battery 22. Here, the PCU 21 is constructed including an unillustrated inverter, so that it is capable of converting direct current power from the battery 22 into alternating current power, and it is also capable of converting alternating current power generated by the first motor-generator 19 and the second motor-generator 20 into direct current power. Thus, the PCU 21 can convert the alternating current power generated by the first motor-generator 19 and the second motor-generator 20 into direct current power, and can supply the direct current power to the battery 22. In addition, the PCU 21 can also convert the direct current power taken out from the battery 22 into alternating current power, and can supply the alternating current power to the first motor-generator 19 and the second motor-generator 20.

Here, when the first motor-generator 19 is driven by the internal combustion engine 1 through the power dividing mechanism 12, it generates alternating current power. Such a first motor-generator 19 is hereinafter referred to as an "MG1". In addition, the second motor-generator 20 can apply a driving force to the vehicle 100 by outputting axial rotation to the power transmission shaft 15. Moreover, when the second motor-generator 20 is driven by the axial rotation inputted from the power transmission shaft 15 at the time of deceleration of the vehicle 100, it generates alternating current power. Such a second motor-generator 20 is hereinafter referred to as an "MG2".

The ECU 10 is an electronic control unit which is composed of a CPU, a ROM, a RAM, a backup RAM, and so on. Various kinds of sensors (illustration omitted), such as a vehicle speed sensor, an SOC sensor for obtaining a state of charge (SOC) of the battery 22, specifically an amount of stored electricity (hereinafter, sometimes referred to as an "amount of SOC") of the battery 22, and so on, are connected to the ECU 10 through electrical wiring, so that the output signals of these sensors are inputted to the ECU 10.

Then, the ECU 10 grasps the operating states of the internal combustion engine 1, the MG1, the MG2, the battery 22 and so on, based on the output signals of these various kinds of sensors, and at the same time, adjusts or optimizes the travel mode of the vehicle 100 based on these operating states. For example, in cases where a requested drive load with respect to the vehicle 100 is relatively large, the ECU 10 causes the vehicle 100 to travel in a mode in which the output of the internal combustion engine 1 and the output of the MG2 are used as driving sources. In addition, for example, in cases where the amount of SOC is relatively large and the requested drive load with respect to the vehicle 100 is relatively small, the ECU 10 causes the vehicle 100 to travel in a mode in which only the output of the MG2 is used as a driving source in a state where the internal combustion engine 1 is stopped (EV travel). Here, note that in such EV travel, only the output of the MG2 may be used as a driving source, or the outputs of the MG1 and the MG2 may be used as driving sources.

In addition, the vehicle 100 is provided with a fuel tank 23. Then, the fuel stored in the fuel tank 23 is pressure fed to the internal combustion engine 1 through fuel piping 24 by means of a low pressure pump (not illustrated) arranged in the fuel tank 23.

<Construction of the Internal Combustion Engine>

FIG. 2 is a view illustrating the schematic construction of the internal combustion engine 1. The internal combustion engine illustrated in FIG. 2 is an internal combustion engine of spark ignition type which is mounted on the vehicle 100 and which is operated by using gasoline as fuel. Also, FIG. 3 is a view illustrating the schematic construction of a high pressure fuel system of the internal combustion engine 1. As illustrated in FIG. 3, the internal combustion engine 1 is provided with four cylinders 2, and each of the cylinders 2 is provided with a fuel injection valve 7 that directly injects fuel into the interior of the cylinder 2. The fuel injection valves 7 are connected to a delivery pipe 71, and the fuel pressurized by a high pressure pump 72 is pressure fed to the delivery pipe 71.

The internal combustion engine 1 is connected with an intake passage 3 for circulating fresh air (air) sucked into the cylinders. In the middle of the intake passage 3, there is arranged a throttle valve 30 that acts to adjust the amount of air to be sucked into the internal combustion engine 1 by changing the channel cross section of the intake passage 3. In addition, an air flow meter 31 for detecting the amount (mass) of fresh air (air) flowing in the intake passage 3 is arranged in the intake passage 3 at a location upstream of the throttle valve 30.

The internal combustion engine 1 is connected with an exhaust passage 4 for circulating burnt gas (exhaust gas) discharged from the cylinders. A catalyst casing 400 is connected with an exhaust pipe 40 which forms the exhaust passage 4. The catalyst casing 400 is constructed such that a catalyst carrier with an exhaust gas purification catalyst supported therein is received in a cylindrical casing. The details thereof will be described later. Then, an air fuel ratio sensor 41 for detecting the air fuel ratio of the gas flowing into the catalyst casing 400 is mounted on the exhaust passage 4 at a location upstream of the catalyst casing 400. In addition, an exhaust gas temperature sensor 42 for detecting the temperature of the gas flowing out from the catalyst casing 400 is mounted on the exhaust passage 4 at a location downstream of the catalyst casing 400.

Various kinds of sensors such as a crank position sensor 5, an accelerator position sensor 6, etc., in addition to the air flow meter 31, the air fuel ratio sensor 41 and the exhaust gas temperature sensor 42 as mentioned above, are electrically connected to the ECU 10. Here, note that the crank position sensor 5 outputs an electrical signal correlated with the rotational position of the output shaft (crankshaft) of the internal combustion engine 1. The accelerator position sensor 6 outputs an electrical signal correlated with an amount of operation (accelerator opening) of an accelerator pedal. The ECU 10 derives an engine rotation speed of the internal combustion engine 1 based on the output signal of the crank position sensor 5, and also derives an engine load of the internal combustion engine 1 based on the output signal of the accelerator position sensor 6.

Moreover, the ECU 10 is electrically connected to various kinds of equipment such as the fuel injection valves 7, the throttle valve 30, the high pressure pump 72 and so on. The ECU 10 electrically controls these various kinds of equipment based on the output signals of the above-mentioned various kinds of sensors.

Now, the high pressure fuel system of the internal combustion engine 1 will be explained in detail based on FIG. 3. The fuel in a low pressure system pressure, which is fed by the low pressure pump (unillustrated) arranged in the fuel tank 23 and flows through the fuel piping 24, is further pressure fed to the delivery pipe 71 by the high pressure pump 72 and is stored in the delivery pipe 71. Mutually independent fuel passages leading to the individual fuel injection valves 7, respectively, are connected to the delivery pipe 71, so that the high pressure fuel is supplied to the individual fuel injection valves 7. In addition, a fuel temperature sensor 73 for detecting the temperature of the fuel in the delivery pipe 71 is mounted on the delivery pipe 71.

A solenoid actuator 7a is arranged in each of the fuel injection valves 7. Each of the solenoid actuators 7a drives, based on a command signal from the ECU 10, a needle (not illustrated) which opens and closes a nozzle hole. In addition, an electric heating wire 7c for electrically heating a fuel passage 7b is arranged in each of the fuel injection valves 7. The electric heating wire 7c is a heat generating member which, when electrically energized, becomes an electric resistance to generate heat. When the electric heating wire 7c is electrically energized, electric current flows to the electric heating wire 7c through a power cable from the battery 22 described in the explanation of the above-mentioned arrangement of the hybrid vehicle. In other words, the battery 22 supplies electric power to the above-mentioned motor, and at the same time supplies electric power to the electric heating wires 7c. Here, note that in this embodiment, each fuel passage 7b corresponds to a predetermined portion related to fuel according to the present disclosure, in particular, a portion related to the atomization of fuel, and each heating wire 7c corresponds to a second heat generating element according to the present disclosure.

Then, when an electric heating wire 7c is supplied with electric power to generate heat so that a corresponding fuel passage 7b is thereby heated, the fuel in the fuel passage 7b is heated. In that case, the fuel with its temperature relatively raised will be injected from a corresponding fuel injection valve 7, thereby promoting atomization of the injected fuel in a corresponding cylinder 2. As a result, the combustion of the fuel in the cylinder 2 is promoted, whereby the discharge of unburnt HC and particulate matter from the cylinder 2 is suppressed. In other words, the discharge of harmful components from the internal combustion engine 1 is suppressed.

Here, note that in this embodiment, the supply of electric power to each electric heating wire 7c is controlled by the ECU 10. In other words, switching of on/off of the supply of electric power to each electric heating wire 7c and adjustment of the electric power to be supplied to each electric heating wire 7c are carried out by the ECU 10.

Further, in this embodiment, the heat generating elements for heating the fuel passages 7b, respectively, are not limited to the above-mentioned electric heating wires 7c. For example, there may be used a well-known arrangement including a microwave generator for generating a microwave and a microwave absorbent which generates heat under the action of radiation of the microwave. In addition, a predetermined portion to be heated is not limited to each fuel passage 7b. The predetermined portion to be heated need only be the portion related to the atomization of fuel, i.e., a portion capable of raising the temperature of fuel, and for example, it may also be the delivery pipe 71 or the fuel piping 24.

Next, reference will be made to an exhaust gas purification apparatus according to this first embodiment. FIG. 4 is a view illustrating the schematic construction of the exhaust gas purification apparatus according to the first embodiment. This exhaust gas purification apparatus includes an electrically heated catalyst (hereinafter, also sometimes referred to as an "EHC") 410.

The EHC 410 is provided with an EHC carrier 411, a mat member 412, and electrodes 413a, 413b. The EHC carrier 411 is received in the catalyst casing 400. The EHC carrier 411 is formed in a cylindrical shape, and is arranged in such a manner that the central axis thereof becomes in alignment with the central axis A of the exhaust pipe 40. The central axis A is a central axis common to the EHC carrier 411 and the catalyst casing 400. A three-way catalyst 411a is supported by the EHC carrier 411. Here, note that the catalyst supported by the EHC carrier 411 is not limited to the three-way catalyst, but may be an oxidation catalyst, a NOx storage reduction catalyst, or a NOx selective catalytic reduction catalyst.

The EHC carrier 411 is formed of a material which, when electrically energized, becomes an electric resistance to generate heat. As the material for the EHC carrier 411, there can be exemplified SiC. The EHC carrier 411 has a plurality of passages which extend in a direction in which the exhaust gas flows (i.e., in a direction in which the central axis A extends), and which have a cross section of honeycomb shape in a direction perpendicular to the direction in which the exhaust gas flows. Then, the exhaust gas flows through these passages. Here, note that the cross sectional shape of the EHC carrier 411 in the direction perpendicular to the central axis A may also be elliptical, etc. Also, in this embodiment, the EHC carrier 411 corresponds to a first heat generating element according to the present disclosure.

A pair of electrodes 413a, 413b are connected to a side surface (outer peripheral surface) of the EHC carrier 411. The electrodes 413a, 413b extend in the circumferential direction and in the axial direction along the outer peripheral surface of the EHC carrier 411, respectively. Then, the electrode 413a and the electrode 413b are in opposition to each other across the EHC carrier 411. However, it is not necessarily necessary for the entire surfaces of the electrode 413a and the electrode 413b to be in opposition to each other. A metal foil 430 is connected to the electrodes 413a, 413b. The metal foil 430 passes through a through hole 412a formed in the mat member 412 to be described later and a through hole 400a formed in the catalyst casing 400, and projects to the outside of the catalyst casing 400. However, the through hole 400a in the catalyst casing 400 is enclosed with an electrode cover 440. Accordingly, the metal foil 430 projects into the interior of the electrode cover 440. A power cable (illustration omitted) is inserted through the electrode cover 440 in a sealed state. Then, the metal foil 430 is connected to the power cable in the interior of the electrode cover 440. When electrically energizing the EHC carrier 411, electric current flows from the battery 22 to the electrodes 413a, 413b through the power cable and the metal foil 430. In other words, the battery 22 supplies electric power to the above-mentioned motor and the electric heating wires 7c arranged in the fuel injection valves 7, and at the same time, supplies electric power to the EHC carrier 411.

In the EHC 410, when the EHC carrier 411 generates heat by electrical energization, the three-way catalyst 411a supported on the EHC carrier 411 is heated. As a result of this, activation of the three-way catalyst 411a is promoted. In addition, a temperature sensor 420 for detecting the temperature of the EHC carrier 411 is arranged in the EHC 410. Here, the temperature of the EHC carrier 411 detected by the temperature sensor 420 can be identified with the temperature of the three-way catalyst 411a. Here, note that in this embodiment, the supply of electric power to the EHC carrier 411 is controlled by the ECU 10. In other words, switching of on/off of the supply of electric power to the EHC carrier 411 and adjustment of the electric power to be supplied to the EHC carrier 411 are carried out by the ECU 10.

The catalyst casing 400 is formed of metal. As a material which forms the catalyst casing 400, there can be exemplified a stainless steel material. An inner wall surface of the catalyst casing 400 is coated with glass which is an electrically insulating material. Then, the mat member 412 is inserted between the inner wall surface of the catalyst casing 400 and the outer peripheral surface of the EHC carrier 411. In other words, in the interior of the catalyst casing 400, the EHC carrier 411 is supported by the mat member 412.

The mat member 412 is formed of an electrically insulating material. As a material which forms the mat member 412, there can be exemplified a ceramic fiber which includes alumina as a main component. The mat member 412 is wound around the outer peripheral surface of the EHC carrier 411. Then, due to the insertion of the mat member 412 between the EHC carrier 411 and the catalyst casing 400, it is possible to suppress electric current from flowing to the catalyst casing 400 at the time when the EHC carrier 411 is electrically energized. In other words, the mat member 412 has not only the function of supporting the EHC carrier 411 inside the catalyst casing 400, but also the function of electrically insulating between the catalyst casing 400 and the EHC carrier 411.

<Electrical Energization Control>

Next, reference will be made to electrical energization control according to this first embodiment. In this embodiment, when the operation of the accelerator pedal is carried out after system power for driving the vehicle 100 (hereinafter, also sometimes referred to simply as "system power") is set to ON, the EV travel of the vehicle 100 is carried out. Then, when the electric power of the battery 22 is consumed by the EV travel and the amount of SOC becomes equal to or less than a first amount of stored electricity (hereinafter, also sometimes referred to as "SOC1"), the battery 22 is charged by the driving force of the internal combustion engine 1. Specifically, alternating current power is generated by the MG1 being driven by means of the internal combustion engine 1 through the power dividing mechanism 12, and the alternating current power thus generated is converted to direct current power by the PCU 21, and is supplied to the battery 22. Here, when the internal combustion engine 1 is started in order to charge the battery 22, if the three-way catalyst 411a supported by the EHC carrier 411 has not been activated, harmful components will be discharged from the vehicle 100 (i.e., a tail pipe of the vehicle) at the time of starting of the internal combustion engine 1. On the other hand, if the three-way catalyst 411a can be activated by electrical energization to the EHC carrier 411 before the internal combustion engine is started, the discharge of harmful components from the vehicle 100 at the time of starting of the internal combustion engine 1 will be suppressed as much as possible.

Here, when the amount of SOC at the time when the system power is set to ON is relatively small, a sufficient amount of electric power can not be used for electrical energization to the EHC carrier 411 to be carried out before the internal combustion engine 1 is started. Then, in cases where an amount of electric power available for the electric energization to the EHC carrier 411 before the starting of the internal combustion engine 1 is less than an amount of electric power required to activate the three-way catalyst 411a supported by the EHC carrier 411 (hereinafter, also sometimes referred to as an "activation amount of electric power"), even if the electrical energization to the EHC carrier 411 is carried out before the starting of the internal combustion engine 1, harmful components may be discharged from the vehicle 100 at the time of starting of the internal combustion engine 1.

Accordingly, in this embodiment, the supply of electric power from the battery 22 to the EHC carrier 411 and/or the electric heating wires 7c arranged in the fuel injection valves 7 is controlled before the starting of the internal combustion engine 1. As a result of this, before the internal combustion engine 1 is started, the electric power from the battery 22 will be distributed to the EHC carrier 411 and/or the electric heating wires 7c in an appropriate manner. As a result, the discharge of harmful components from the vehicle 100 at the time of starting of the internal combustion engine 1 can be suppressed as much as possible. This will be explained in detail by the use of flow charts illustrated in FIG. 5 and FIG. 6. Here, note that the ECU 10 functions as a control apparatus for a vehicle according to the present disclosure by executing a control flow or routine which will be explained below.

FIG. 5 and FIG. 6 are flow charts illustrating the control flow or routine according to this embodiment. In this embodiment, this flow or routine is executed at a predetermined operation interval in a repeated manner by the ECU 10.

In this routine, first in step S101, it is determined whether a catalyst activation flag is OFF and whether the system power is ON. Here, the catalyst activation flag is a flag which is set to ON in cases where it is estimated that the three-way catalyst 411a has been activated, and the setting thereof is carried out by well-known processing different from this routine. In step S101, the above-mentioned are determined by reading the catalyst activation flag which has been set in this manner. Then, in cases where an affirmative determination is made in step S101, the routine of the ECU 10 goes to the processing of step S102, whereas in cases where a negative determination is made in step S101, the execution of this routine is ended.

Here, as mentioned above, when the accelerator pedal is operated after the system power is set to ON, the vehicle 100 is made to run in the EV travel mode. Accordingly, for example, when power supply (electrical energization) processing to be described later in the processing of step S114 is started at a timing at which the system power is set to ON, the electrical energization processing will be carried out before the vehicle 100 is run in the EV travel mode. Here, note that this electrical energization processing can also be continuously carried out during the EV travel of the vehicle 100. In addition, in this embodiment, in step S101, it is determined whether the catalyst activation flag is OFF and whether the system power is ON, but there is no intention to limit the disclosure to this. For example, in step S101, it may be determined whether the catalyst activation flag is OFF and whether a driver gets in the vehicle 100. In that case, the electrical energization processing can be carried out before the system power is set to ON. Here, note that it can be determined based on a well-known technique (e.g., based on an electric signal outputted by a seating recognition sensor arranged in a seat of the vehicle 100) whether the driver gets in the vehicle 100.

In cases where an affirmative determination is made in step S101, then in step S102, the current amount SOCn of the SOC is obtained. In step S103, the current amount SOCn can be obtained based on the output value of the SOC sensor.

Then, in step S103, an upper limit amount (hereinafter, also sometimes referred to as a "suppliable amount of electric power") Ep of the electric power which is capable of being supplied from the battery 22 to the EHC carrier 411 and/or the electric heating wires 7c before the starting of the internal combustion engine 1 is calculated. In step S103, the suppliable amount of electric power Ep is calculated by the following equation 1.

$$Ep = SOCn - SOC2 \quad \text{Expression 1}$$

Ep: the suppliable amount of electric power
SOCn: the current amount obtained in step S102
SOC2: a second amount of stored electricity Here, the second amount of stored electricity SOC2 is an amount of SOC which is obtained by adding a predetermined margin to the above-mentioned first amount of stored electricity SOC1. When the battery 22 has electric power in the second amount of stored electricity SOC2, the vehicle 100 can be made to run in the EV travel mode, without starting the internal combustion engine 1. In other words, while the electrical energization processing to be described later in the processing of step S114 is carried out by using the electric power in this suppliable amount of electric power Ep, the vehicle 100 can be run in the EV travel mode by using this predetermined margin of electric power.

Subsequently, in step S104, it is determined whether the suppliable amount of electric power Ep calculated in step S103 is larger than 0. Then, in cases where an affirmative determination is made in step S104, the routine of the ECU 10 goes to the processing of step S105. On the other hand, in cases where a negative determination is made in step S104, i.e., in this case, the supply of electric power to the EHC carrier 411 and/or the electric heating wires 7c can not be made before the starting of the internal combustion engine 1, and hence, the execution of this routine is ended. In other words, the electrical energization processing is not carried out.

In cases where an affirmative determination is made in step S104, then in step S105, the fuel temperature Tf is obtained. In step S105, the fuel temperature Tf can be obtained based on the output value of the fuel temperature sensor 73.

Thereafter, in step S106, it is determined whether the fuel temperature Tf obtained in step S105 is lower than a predetermined determination temperature Tfth. The determination temperature Tfth is a temperature related to the atomization of fuel injected from the fuel injection valves 7. Here, the correlation between the fuel temperature Tf and the concentration of HC discharged from the internal combustion engine 1 (the concentration of discharged HC) is illustrated in FIG. 7. As illustrated in FIG. 7, there is a tendency that whether the fuel temperature Tf is lower or higher than a predetermined temperature T1, the concentration of discharged HC increases. Then, in cases where the fuel temperature Tf is lower than the predetermined temperature T1, there is a tendency that the higher the fuel temperature Tf, the lower the concentration of discharged HC becomes. In this case, the higher the fuel temperature Tf, the more the atomization of fuel injected from the fuel injection valves 7 is promoted. For that reason, the concentration of discharged HC will become lower. Accordingly, in this embodiment, the determination temperature Tfth is set to the predetermined temperature T1 as indicated in FIG. 7. In that case, in cases where the fuel temperature Tf is lower than the determination temperature Tfth, the concentration of discharged HC can be decreased by raising the temperature of fuel. Then, in cases where an affirmative determination is made in step S106, the routine of the ECU 10 goes to the processing of step S107. On the other hand, in cases where a negative determination is made in step S106, i.e., in this case, the concentration of discharged HC can not be decreased even if the temperature of fuel is raised, and hence, the execution of this routine is ended.

In cases where an affirmative determination is made in step S106, then in step S107, the temperature Tc of the three-way catalyst 411a (hereinafter, also sometimes referred to as "the catalyst temperature Tc") is obtained. In step S107, the catalyst temperature Tc can be obtained based on the output value of the temperature sensor 420 mounted on the EHC 410. Alternatively, the catalyst temperature during the operation of the internal combustion engine 1 is estimated based on the output value of the exhaust gas temperature sensor 42, and then, the current value of the catalyst temperature Tc can be estimated based on the catalyst temperature thus estimated and a period of time elapsed after the internal combustion engine 1 is stopped.

Subsequently, in step S108, a first amount of electric power E1 and a second amount of electric power E2 are obtained based on the catalyst temperature Tc obtained in step S107. Here, the second amount of electric power E2 is an amount of electric power required to activate the three-way catalyst 411a by using the EHC carrier 411, i.e., the activation amount of electric power. In addition, the first amount of electric power E1 is a predetermined amount of electric power smaller than the second amount of electric power E2, and is defined based on a purification rate improvement effect due to electrical heating of the three-way catalyst 411a in a cold state, and a fuel combustion promoting effect due to electrical heating of the fuel passages 7b of the internal combustion engine 1 in a cold state (i.e., resulting from the promotion of the atomization of fuel injected from the fuel injection valves 7). The first amount of electric power E1 and the second amount of electric power E2 will be explained below based on FIG. 8 through FIG. 10.

FIG. 8 is a view illustrating a correlation between an amount of electric power Es1 to be supplied from the battery 22 to the EHC carrier 411 (hereinafter, also sometimes referred to as a "first amount of supplied electric power") and a purification rate of harmful components in the exhaust gas in the three-way catalyst 411a (hereinafter, also sometimes referred to simply as a "purification rate"). Here, note that in FIG. 8, when the first amount of supplied electric power Es1 is 0, the three-way catalyst 411a is assumed to be in a cold state. In addition, FIG. 9 is a view illustrating a correlation between an amount of electric power Es2 to be supplied from the battery 22 to the electric heating wires 7c (hereinafter, also sometimes referred to as a "second amount of supplied electric power") and the concentration of HC discharged from the internal combustion engine 1 (a concentration of discharged HC). Here, note that in FIG. 9, when the second amount of supplied electric power Es2 is 0, the internal combustion engine 1 is assumed to be in a cold state.

As illustrated in FIG. 8, the purification rate remains low as long as the first amount of supplied electric power Es1 does not become larger than a certain amount, whereas when the first amount of supplied electric power Es1 becomes larger than this amount, the purification rate increases to a relatively large extent according to an increase in the amount of supplied electric power. In other words, a degree of increase in the purification rate according to the increase in the amount of supplied electric power (hereinafter, also sometimes referred to simply as a "degree of increase in the purification rate") changes to a large extent at this amount of electric power. Then, in this embodiment, the amount of electric power at this time becomes the first amount of electric power E1. In that case, when the first amount of supplied electric power Es1 is less than the first amount of electric power E1, the purification rate is low and the degree of the increase of the purification rate is small. In contrast to this, when the first amount of supplied electric power Es1 is more than the first amount of electric power E1, the degree of increase in the purification rate becomes large.

However, even if the first amount of supplied electric power Es1 is more than the first amount of electric power E1, when the first amount of supplied electric power Es1 increases to the vicinity of the above-mentioned activation amount of electric power, the degree of increase in the purification rate becomes small. Then, when the first amount of supplied electric power Es1 reaches the activation amount of electric power, the purification rate reaches an upper limit. In other words, the three-way catalyst 411a will be activated. Then, the amount of electric power at this time (i.e., the activation amount of electric power) becomes the second amount of electric power E2.

In addition, as illustrated in FIG. 9, there is a tendency that the more the second amount of supplied electric power Es2, the smaller the concentration of discharged HC becomes. This is because the more the second amount of supplied electric power Es2, the higher the fuel temperature Tf becomes, and in cases where the fuel temperature Tf is lower than the determination temperature Tfth, the concentration of discharged HC becomes lower according to the rise of the fuel temperature Tf, as described in the above-mentioned explanation of FIG. 7. Then, it is found that the degree of decrease in the concentration of discharged HC according to the increase in the amount of supplied electric power becomes larger when the second amount of supplied electric power Es2 is smaller than the first amount of electric power E1, than when the second amount of supplied electric power Es2 is equal to or larger than the first amount of electric power E1.

Then, when the first amount of electric power E1 is defined as mentioned above, in cases where the three-way catalyst 411a or the fuel passages 7b are electrically heated by using an amount of electric power equal to or less than the first amount of electric power E1, the reduction effect of the harmful components discharged from the vehicle 100 at the time of starting of the internal combustion engine 1 becomes larger in the case where the fuel passages 7b are electrically heated, in comparison with the case where the three-way catalyst 411a is electrically heated.

Further, in this embodiment, the first amount of electric power E1 and the second amount of electric power E2 change with the catalyst temperature Tc in the cold state of the three-way catalyst 411a. FIG. 10 is a view for explaining the influence of the catalyst temperature Tc in the cold state on the correlation between the first amount of supplied electric power Es1 and the purification rate. In FIG. 10, the correlation illustrated in the above-mentioned FIG. 8 is indicated by a broken line, and the above-mentioned correlation at the time when the catalyst temperature Tc in the cold state is higher than that in FIG. 8 is indicated by a solid line.

As illustrated in FIG. 10, in cases where the first amount of supplied electric power Es1 is the same, the purification rate becomes higher when the catalyst temperature Tc in the cold state is high (the solid line in FIG. 10) than when it is low (the broken line in FIG. 10). This is because in cases where an electric power in the same first amount of supplied electric power Es1 is supplied, the higher the catalyst temperature Tc in the cold state, the higher the catalyst temperature after the supply of the electric power also becomes. Then, the first amount of electric power at the time when the catalyst temperature Tc in the cold state is high (indicated by E1' in FIG. 10) becomes smaller than the first amount of electric power at the time when the catalyst temperature Tc in the cold state is low (indicated by E1 in FIG. 10). In addition, the second amount of electric power at the time when the catalyst temperature Tc in the cold state is high (indicated by E2' in FIG. 10) becomes smaller than the second amount of electric power at the time when the catalyst temperature Tc in the cold state is low (indicated by E2 in FIG. 10).

Then, returning to the explanation of FIG. 5 and FIG. 6, the values of the first amount of electric power E1 and the second amount of electric power E2 corresponding to the catalyst temperature Tc have been stored in the ROM of the ECU 10 in advance as a map or a function. Then, in step S108, the first amount of electric power E1 and the second amount of electric power E2 are obtained based on the catalyst temperature Tc obtained in step S107 and the map or function stored in the ROM of the ECU 10.

After the processing of step S108, then in step S109, it is determined whether the suppliable amount of electric power Ep calculated in step S103 is less than the first amount of electric power E1 obtained in step S108. Then, in cases where an affirmative determination is made in step S109, the routine of the ECU 10 goes to the processing of step S110, whereas in cases where a negative determination is made in step S109, the routine of the ECU 10 goes to the processing of step S111.

In cases where a negative determination is made in step S109, subsequently in step S111, it is determined whether the suppliable amount of electric power Ep calculated in step S103 is more than the first amount of electric power E1 obtained in step S108, and is equal to or less than the second amount of electric power E2 obtained in step S108. Then, in cases where an affirmative determination is made in step S111, the routine of the ECU 10 goes to the processing of step S112, whereas in cases where a negative determination is made in step S111, the routine of the ECU 10 goes to the processing of step S113.

Then, in the processings of steps S110, S112 and S113, the first amount of supplied electric power Es1 and the second amount of supplied electric power Es2 are set. These processings will be explained below based on FIG. 11.

FIG. 11 is a view for explaining the distribution of electric power from the battery 22 to the EHC carrier 411 and/or the heating wires 7c in the first embodiment. In FIG. 11, the axis of abscissa represents the first amount of supplied electric power Es1, and the axis of ordinate represents the second amount of supplied electric power Es2. In addition, a plurality of line segments connecting between the axis of abscissa and the axis of ordinate indicate power distribution relations between the first amount of supplied electric power Es1 and the second amount of supplied electric power Es2 in a plurality of suppliable amounts of electric power. For example, a line segment L1 indicates a power distribution relation in the case where the suppliable amount of electric power is E1 (the first amount of electric power), and a line segment L2 indicates a power distribution relation in the case where the suppliable amount of electric power is E2 (the second amount of electric power). Moreover, each circle mark in FIG. 11 indicates a power distribution relation between the first amount of supplied electric power Es1 and the second amount of supplied electric power Es2 in each suppliable amount of electric power.

As illustrated in FIG. 11, in cases where the suppliable amount of electric power is the first amount of electric power E1, the first amount of supplied electric power Es1 is set to 0, and the second amount of supplied electric power Es2 is set to the first amount of electric power E1. In other words, they are set in such a manner that the full or whole amount of electric power within the suppliable amount of electric power is supplied to the electric heating wires 7c. In addition, in cases where the suppliable amount of electric power is smaller than the first amount of electric power E1 (i.e., indicated by an arrow A1 in FIG. 11), too, they are set in such a manner that the full or whole amount of electric power within the suppliable amount of electric power is supplied to the electric heating wires 7c. This corresponds to a situation where when an affirmative determination is made in step S109, then in step S110, the first amount of supplied electric power Es1 is set to 0, and the second amount of supplied electric power Es2 is set to the suppliable amount of electric power Ep calculated in step S103.

Moreover, as illustrated in FIG. 11, in cases where the suppliable amount of electric power is the second amount of electric power E2, the first amount of supplied electric power Es1 is set to the second amount of electric power E2, and the second amount of supplied electric power Es2 is set to 0. In other words, they are set in such a manner that the full or whole amount of electric power within the suppliable amount of electric power is supplied to the EHC carrier 411. In addition, in cases where the suppliable amount of electric power is more than the first amount of electric power E1 and less than the second amount of electric power E2 (i.e., indicated by an arrow A2 in FIG. 11), too, they are set in such a manner that the full or whole amount of electric power within the suppliable amount of electric power is supplied to the EHC carrier 411. This corresponds to a situation where when an affirmative determination is made in step S111, then in step S112, the first amount of supplied electric power Es1 is set to the suppliable amount of electric power Ep calculated in step S103, and the second amount of supplied electric power Es2 is set to 0.

Further, as illustrated in FIG. 11, in cases where the suppliable amount of electric power is more than the second amount of electric power E2 (i.e., indicated by an arrow A3 in FIG. 11), the first amount of supplied electric power Es1 is set to the second amount of electric power E2. Then, an amount of electric power, which is obtained by subtracting the second amount of electric power E2 from the suppliable amount of electric power, is set as the second amount of supplied electric power Es2. In other words, they are set in such a manner that electric power in the second amount of electric power E2 is supplied to the EHC carrier 411, and electric power in the amount of electric power obtained by subtracting the second amount of electric power E2 from the suppliable amount of electric power is supplied to the electric heating wires 7c. This corresponds to a situation where when a negative determination is made in step S111, then in step S113, the first amount of supplied electric power Es1 is set to the second amount of electric power E2 obtained in step S108, and the second amount of supplied electric power Es2 is set to the amount of electric power obtained by subtracting the second amount of electric power E2 obtained in step S108 from the suppliable amount of electric power Ep calculated in step S103.

After the processing of step S110, S112 or S113, then in step S114, the electrical energization processing of supplying electric power from the battery 22 to the EHC carrier 411 and/or the electric heating wires 7c is carried out. When the ECU 10 carries out this electrical energization processing, the three-way catalyst 411a and/or the fuel passages 7b of the internal combustion engine 1 can be electrically heated before the starting of the internal combustion engine 1. At this time, with the first amount of supplied electric power Es1 and the second amount of supplied electric power Es2 being set as mentioned above, the supply of electric power from the battery 22 to the EHC carrier 411 and/or the electric heating wires 7c will be controlled based on the purification rate improvement effect due to the electrical heating of the three-way catalyst 411a in the cold state, and the fuel combustion promoting effect due to the electrical heating of the fuel passages 7b of the internal combustion engine 1 in the cold state, so that the harmful components discharged from the vehicle 100 at the time of starting of the internal combustion engine 1 can be minimized.

Subsequently, in step S115, an integrated amount Esum of the electric power supplied from the battery 22 to the EHC carrier 411 and/or the electric heating wires 7c is obtained. Then, in step S116, it is determined whether the integrated amount Esum obtained in step S115 becomes equal to or more than the suppliable amount of electric power Ep calculated in step S103. In cases where an affirmative determination is made in step S116, the execution of this flow or routine is ended. On the other hand, in cases where a negative determination is made in step S116, the routine of the ECU 10 returns to the processing of step S114.

By carrying out the control as explained above, the ECU 10 can suppress the discharge of harmful components from the vehicle 100 at the time of starting of the internal combustion engine 1 as much as possible.

Here, note that with respect to the heating of the exhaust gas purification catalyst, in this embodiment, the EHC carrier 411 generates heat by receiving the supply of electric power from the battery 22, and the three-way catalyst 411a is thereby heated, but there is no intention to limit the disclosure to this. For example, the three-way catalyst 411a may be heated by electric heating wires which generates heat by receiving the supply of electric power from the battery 22.

In addition, in this embodiment, reference has been made, by way of example, to the hybrid vehicle which is provided with the internal combustion engine and the motor-generator, but there is no intention to limit the disclosure to this. In a vehicle which is not provided with a motor-generator, too, by carrying out the above-mentioned control by means of an ECU, it is possible to suppress the discharge of harmful components from the vehicle at the time of starting of an internal combustion engine as much as possible. Here, note that in this case, the vehicle is not run in the EV travel mode. For that reason, the suppliable amount of electric power is calculated based on the amount of electricity stored in a battery before electrical energization processing to the EHC carrier 411 and/or the electric heating wires 7c is carried out. Then, the discharge of harmful components at the time of starting of the internal combustion engine can be reduced in an appropriate manner by carrying out the above-mentioned electrical energization processing before the system power is set to ON (e.g., in cases where it is detected that a driver gets in the vehicle).

Modification of the First Embodiment

Next, reference will be made to a modification of the above-mentioned first embodiment of the present disclosure. Here, note that in this modification, the detailed explanation of substantially the same construction and substantially the same control processing as in the first embodiment will be omitted.

In the above-mentioned first embodiment, the portion related to the atomization of fuel, i.e., the portion capable of raising the temperature of fuel, is electrically heated, whereby the atomization of fuel injected from each fuel injection valve 7 is promoted. As a result, the discharge of unburnt HC and PM from each cylinder 2 is suppressed. In contrast to this, in this modification, a portion related to the adhesion of fuel is electrically heated. With this, the adhesion of fuel is suppressed, whereby the discharge of unburnt HC and PM from each cylinder is suppressed.

FIG. 12 is a view illustrating a cross sectional schematic construction of a cylinder of an internal combustion engine 1 according to this modification. In this modification, an electric heating wire 2b is embedded in a wall surface of a cylinder sleeve 2a. The electric heating wire 2b is a heat generating member which, when electrically energized, becomes an electric resistance to generate heat. When the electric heating wire 2b is electrically energized, electric current is made to flow there from a battery 22 through a power cable. In such an arrangement, the generation of heat of the electric heating wire 2b electrically energized will heat the sleeve 2a. Here, note that in this modification, the sleeve 2a corresponds to a predetermined portion related to fuel according to the present disclosure, in particular, a portion related to the adhesion of fuel, and the electric heating wire 2b corresponds to a second heat generating element according to the present disclosure.

Here, fuel injected from the fuel injection valve 7 tends to adhere to the sleeve 2a. Thus, fuel may adhere to the sleeve 2a, but in cases where the temperature of the sleeve 2a is relatively high, the fuel adhered to the sleeve 2a will evaporate, as a result of which the adhesion of the fuel will be suppressed. In other words, when the internal combustion engine 1 is in a cold state, the adhesion of fuel can be suppressed by electrically energizing the electric heating wire 2b thereby to heat the sleeve 2a. As a result of this, the discharge of harmful components from the internal combustion engine 1 at the time of starting of the internal combustion engine 1 can be suppressed.

Here, note that, the portion related to the adhesion of fuel is not limited to the sleeve 2a. For example, when the wall of a combustion chamber in a cylinder head or the top face of a piston in the cylinder is electrically heated while the internal combustion engine 1 is in the cold state, the fuel injected from the fuel injection valve 7 is suppressed from adhering to these locations, and as a result, the discharge of harmful components from the internal combustion engine 1 at the time of starting of the internal combustion engine 1 can be suppressed. In addition, in cases where the fuel from the fuel injection valve 7 is injected into an intake port, the wall of the intake port may be electrically heated, when the internal combustion engine 1 is in the cold state.

Then, by controlling the supply of electric power from the battery 22 to the EHC carrier 411 and/or the electric heating wire 2b before the starting of the internal combustion engine 1, similarly to the above-mentioned first embodiment, it becomes possible to suppress the discharge of harmful components from the vehicle 100 at the time of starting of the internal combustion engine 1 as much as possible.

Second Embodiment

Next, reference will be made to a second embodiment of the present disclosure. Here, note that in this second embodiment, the detailed explanation of substantially the same construction and substantially the same control processing as in the above-mentioned first embodiment will be omitted.

The internal combustion engine 1 in the above-mentioned first embodiment is an internal combustion engine of spark ignition type which is operated by using gasoline as fuel. In contrast to this, the internal combustion engine 1 in this second embodiment is an internal combustion engine of spark ignition type which is operated by using fuel in which an alcohol component is mixed with gasoline (hereinafter, also sometimes referred to as "alcohol mixed fuel").

The alcohol component tends to be harder to evaporate than gasoline. Accordingly, in the case where the alcohol mixed fuel is used as fuel for the internal combustion engine 1, the fuel injected from each fuel injection valve 7 becomes harder to be atomized than in the case where gasoline is used. In addition, in the case where the alcohol mixed fuel is used as fuel for the internal combustion engine 1, the fuel, which is injected from each fuel injection valve 7 and is adhered to each sleeve 2a for example, becomes harder to evaporate than in the case where gasoline is used.

On the other hand, when the fuel temperature becomes relatively high, the above-mentioned tendency is mitigated. Specifically, each fuel passage 7b is electrically heated before the starting of the internal combustion engine 1, so that the higher the temperature of the alcohol mixed fuel injected from the fuel injection valve 7 at the time of starting of the internal combustion engine 1, the smaller becomes the degree to which the atomization of the alcohol mixed fuel deteriorates, in comparison with gasoline. Also, each sleeve 2a is electrically heated before the starting of the internal combustion engine 1, so that the higher the temperature of the alcohol mixed fuel adhered to the sleeve 2a, the smaller becomes the degree to which the adhesion of the alcohol mixed fuel deteriorates, in comparison with gasoline.

In view of the above, the correlation between the second amount of supplied electric power Es2 and the concentration of HC discharged from the internal combustion engine 1 (the concentration of discharged HC) will be different between the case where gasoline is used as fuel for the internal combustion engine 1 (see the above-mentioned FIG. 9) and the case where the alcohol mixed fuel is used. This will be explained below based on FIG. 13.

FIG. 13 is a view for explaining the influence of the alcohol concentration in the alcohol mixed fuel on the correlation between the second amount of supplied electric power Es2 and the discharged HC concentration. Here, note that in FIG. 13, when the second amount of supplied electric power Es2 is 0, the internal combustion engine 1 is assumed to be in a cold state. In addition, in FIG. 13, the correlation illustrated in the above-mentioned FIG. 9 is indicated by a broken line, and the above-mentioned correlation in the case where the alcohol mixed fuel is used as fuel for the internal combustion engine 1 is indicated by a solid line.

As illustrated in FIG. 13, there is a tendency that the more the second amount of supplied electric power Es2, the smaller the concentration of discharged HC becomes. Here, as described in the above-mentioned explanation of FIG. 9, in cases where gasoline is used as fuel for the internal combustion engine 1, the degree of decrease in the concentration of discharged HC according to the increase in the amount of supplied electric power (hereinafter, also sometimes referred to simply as "the degree of decrease in the concentration of discharged HC") becomes larger when the second amount of supplied electric power Es2 is smaller than the first amount of electric power E1, than when the second amount of supplied electric power Es2 is equal to or larger than the first amount of electric power E1 (this is indicated by the broken line in FIG. 13). In other words, the degree of decrease in the concentration of discharged HC changes to a relatively large extent at the first amount of electric power E1. On the other hand, in cases where the alcohol mixed fuel is used as fuel for the internal combustion engine 1 and the alcohol concentration thereof is low (i.e., indicated by a line L3 in FIG. 13), the degree of decrease in the concentration of discharged HC changes to a relatively large extent at an amount of electric power E11. In other words, the degree of decrease in the concentration of discharged HC becomes larger when the second amount of supplied electric power Es2 is smaller than the amount of electric power E11, than when the second amount of supplied electric power Es2 is equal to or larger than the amount of electric power E11. In addition, in cases where the alcohol concentration in the alcohol mixed fuel is high (i.e., indicated by a line L4 in FIG. 13), the degree of decrease in the concentration of discharged HC changes to a relatively large extent at an amount of electric power E12.

Then, when a comparison is made between the degree of decrease in the concentration of discharged HC at the time when the second amount of supplied electric power Es2 is smaller than the amount of electric power E11 in the line L3 of FIG. 13, and the degree of decrease in the concentration of discharged HC at the time when the second amount of supplied electric power Es2 is less than the amount of electric power E12 in the line L4 of FIG. 13, the degree of decrease in the concentration of discharged HC is larger in the latter than in the former. According to this, it is found that the higher the alcohol concentration in the alcohol mixed fuel, the larger becomes the fuel combustion promotion effect due to the electric heating of the predetermined portion of the fuel passages 7b of the internal combustion engine 1 in a cold state (also referred to as an internal combustion engine heating effect).

As described above, from FIG. 13, it is found that when the alcohol concentration in the alcohol mixed fuel is low, a relatively large internal combustion engine heating effect is obtained in the case where the second amount of supplied electric power Es2 is smaller than the amount of electric power E11, whereas when the alcohol concentration in the alcohol mixed fuel is high, a relatively large internal combustion engine heating effect is obtained in the case where the second amount of supplied electric power Es2 is smaller than the amount of electric power E12.

In addition, FIG. 14 is a view illustrating the amounts of electric power E11, E12 illustrated in FIG. 13 overlapped on the above-mentioned correlation between the first amount of supplied electric power Es1 and the purification rate illustrated in FIG. 8. As illustrated in FIG. 14, when the first amount of supplied electric power Es1 is the amount of electric power E11, the purification rate becomes higher than when the first amount of supplied electric power Es1 is the first amount of electric power E1. Also, when the first amount of supplied electric power Es1 is the amount of electric power E12, the purification rate becomes higher than when the first amount of supplied electric power Es1 is the amount of electric power E11.

Then, in this second embodiment, based on the fuel combustion promotion effect illustrated in FIG. 13 and the purification rate improvement effect illustrated in FIG. 14, the amount of electric power E11 is set as the first amount of electric power, when the alcohol concentration in the alcohol mixed fuel is low. In that case, in cases where the three-way catalyst 411a or the fuel passages 7b are electrically heated by using an amount of electric power equal to or less than the first amount of electric power E11, the reduction effect of the harmful components discharged from the vehicle 100 at the time of starting of the internal combustion engine 1 becomes larger in the case where the fuel passages 7b are electrically heated, in comparison with the case where the three-way catalyst 411a is electrically heated. In addition, similarly, the amount of electric power E12 is set as the first amount of electric power, when the alcohol concentration in the alcohol mixed fuel is high.

Further, in this second embodiment, in the electrical energization processing to the EHC carrier 411 and/or the electric heating wires 7c carried out before the starting of the internal combustion engine 1, the first amount of supplied electric power Es1 and the second amount of supplied electric power Es2 are set similarly to the above-mentioned first embodiment. This will be explained below based on FIG. 15A and FIG. 15B.

FIG. 15A and FIG. 15B are views for explaining the distribution of electric power from the battery 22 to the EHC carrier 411 and/or the heating wires 7c in the second embodiment. Here, note that FIG. 15A illustrates an example of settings of the first amount of supplied electric power Es1 and the second amount of supplied electric power Es2 at the time when the alcohol concentration in the alcohol mixed fuel is low (i.e., corresponding to the line L3 in the above-mentioned FIG. 13). Also, FIG. 15B illustrates an example of settings of the first amount of supplied electric power Es1 and the second amount of supplied electric power Es2 at the time when the alcohol concentration in the alcohol mixed fuel is high (i.e., corresponding to the line L4 in the above-mentioned FIG. 13). In FIG. 15A and FIG. 15B, a plurality of line segments connecting between the axis of abscissa and the axis of ordinate indicate power distribution relations between the first amount of supplied electric power Es1 and the second amount of supplied electric power Es2 in a plurality of suppliable amounts of electric power, as in the above-mentioned FIG. 11.

As illustrated in FIG. 15A, in cases where the suppliable amount of electric power is equal to or less than the first amount of electric power E11, the full or whole amount of electric power within the suppliable amount of electric power is set so as to be supplied to the electric heating wires 7c. Then, in cases where the suppliable amount of electric power is more than the first amount of electric power E11 and less than the second amount of electric power E2, they are set in such a manner that the full or whole amount of electric power within the suppliable amount of electric power is supplied to the EHC carrier 411. Further, in cases where the suppliable amount of electric power is larger than the second amount of electric power E2, they are set in such a manner that electric power in the second amount of electric power E2 is supplied to the EHC carrier 411, and electric power in the amount of electric power obtained by subtracting the second amount of electric power E2 from the suppliable amount of electric power is supplied to the electric heating wires 7c.

Here, note that when the alcohol concentration in the alcohol mixed fuel is high, too, similarly to this, the first amount of supplied electric power Es1 and the second amount of supplied electric power Es2 are set as illustrated in FIG. 15B.

Thus, in this second embodiment, the first amount of electric power is set larger when the alcohol concentration in the alcohol mixed fuel is high, than when it is low, and electric power in the amounts of electric power distributed based on the first amount of electric power thus set (i.e., the first amount of supplied electric power Es1 and the second amount of supplied electric power Es2) is supplied to the EHC carrier 411 and/or the electric heating wires 7c. Here, note that the setting of the first amount of electric power at this time is carried out by the above-mentioned processing of step S108 illustrated in FIG. 5. In addition, the ECU 10 functions as a setting unit according to the present disclosure by performing the processing of step S108.

Here, the concentration of HC discharged from the internal combustion engine 1 (i.e., the concentration of dis- charged HC) changes not only with the alcohol concentration in the alcohol mixed fuel, but also with the fuel temperature before electrical energization to the electric heating wires 7c, the cooling water temperature of the internal combustion engine 1, etc. In other words, the first amount of electric power can be set according to these parameters. Accordingly, in this second embodiment, in the processing of step S108 illustrated in the above-mentioned FIG. 5, the first amount of electric power is obtained based on a map or a function in which these parameters are taken into consideration. Here, note that the map in which these parameters are taken into consideration may be stored in the ROM of the ECU 10, or may be stored in an external server device. In cases where the map is stored in the server device, the ECU 10 transmits the values of parameters such as the alcohol concentration, the fuel temperature before electrical energization to the electric heating wires 7c, and the cooling water temperature of the internal combustion engine 1, to the server device through an external communication device provided in the vehicle 100. Then, the ECU 10 can obtain the first amount of electric power by receiving the first amount of electric power calculated by the server device through the external communication device.

In the second embodiment mentioned above, too, it is possible to suppress the discharge of harmful components from the vehicle 100 at the time of starting of the internal combustion engine 1 as much as possible.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. A control apparatus for a vehicle which is applied to the vehicle including:
   an exhaust gas purification catalyst arranged in an exhaust passage of an internal combustion engine and configured to remove a predetermined component contained in an exhaust gas of the internal combustion engine;
   a first heat generating element arranged in the exhaust passage and configured to generate heat by being supplied with electric power thereby to heat the exhaust gas purification catalyst;
   a second heat generating element configured to generate heat by being supplied with electric power thereby to heat a predetermined portion related to the fuel to be burnt in the internal combustion engine; and
   a battery configured to supply electric power to the first heat generating element and the second heat generating element,
   the control apparatus comprising:
   a controller including at least one processor configured to control the supply of electric power from the battery to the first heat generating element and/or the second heat generating element before starting of the internal combustion engine, wherein
   the controller controls the supply of electric power such that:
   in cases where a suppliable amount of electric power, which is an upper limit amount of electric power capable of being supplied from the battery to the first heat generating element and/or the second heat generating element before the starting of the internal combustion engine, is equal to or less than a second amount of electric power, which is an amount of electric power required to activate the exhaust gas purification catalyst by using the first heat generating element, and in cases where the suppliable amount of electric power is equal to or less than a predetermined first amount of electric power smaller than the second amount of electric power, a whole amount of electric power within the suppliable amount of electric power is supplied to the first heat generating element before the starting of the internal combustion engine; and in cases where the suppliable amount of electric power is larger than the first amount of electric power, the whole amount of electric power within the suppliable amount of electric power is supplied to the first heat generating element before the starting of the internal combustion engine.

2. The control apparatus for a vehicle according to claim 1, wherein the controller controls the supply of electric power such that in cases where the suppliable amount of electric power is larger than the second amount of electric power, electric power in the second amount of electric power is supplied to the first heat generating element, before the starting of the internal combustion engine, and electric power in an amount of electric power which is obtained by subtracting the second amount of electric power from the suppliable amount of electric power is supplied to the second heat generating element.

3. The control apparatus for a vehicle according to claim 2, wherein an alcohol component is included in the fuel, and
the controller further configured to:
set the first amount of electric power larger when an alcohol concentration in the fuel is high, than when it is low, wherein the controller controls the supply of electric power from the battery to the first heat generating element and/or the second heat generating element, based on the first amount of electric power set by the controller.

4. The control apparatus for a vehicle according to claim 1, wherein an alcohol component is included in the fuel, and
the controller further configured to:
set the first amount of electric power larger when an alcohol concentration in the fuel is high, than when it is low, wherein the controller controls the supply of electric power from the battery to the first heat generating element and/or the second heat generating element, based on the first amount of electric power set by the controller.

5. The control apparatus for a vehicle according to claim 1, wherein the predetermined portion includes a portion related to atomization of the fuel injected from a fuel injection valve provided by the internal combustion engine.

6. The control apparatus for a vehicle according to claim 1, wherein the predetermined portion includes a portion related to adhesion of the fuel injected from a fuel injection valve provided by the internal combustion engine.

7. The control apparatus for a vehicle according to claim 1, wherein the vehicle is a hybrid vehicle which is provided with the internal combustion engine and an electric motor, and which is capable of traveling by means of a driving force of the electric motor in a state where the internal combustion engine has been stopped;

the battery supplies electric power to the first heat generating element, the second heat generating element and the electric motor; and when an amount of stored electricity in the battery at the time when charging of the battery by a driving force of the internal combustion engine is requested is defined as a first amount of stored electricity, and when an amount of stored electricity which is the first amount of stored electricity added by a predetermined margin is defined as a second amount of stored electricity, the suppliable amount of electric power is defined as an amount of electric power which is obtained by subtracting the second amount of stored electricity from an amount of stored electricity in the battery before the supply of electric power from the battery to the first heat generating element and/or the second heat generating element is carried out.

* * * * *